United States Patent
Mohamed et al.

(10) Patent No.: US 12,276,034 B1
(45) Date of Patent: Apr. 15, 2025

(54) MOLYBDENUM-DOPED ZINC/COBALT OXIDE ELECTROCATALYST FOR HYDROGEN PRODUCTION

(71) Applicant: KING FAHD UNIVERSITY OF PETROLEUM AND MINERALS, Dhahran (SA)

(72) Inventors: Mohamed Jaffer Sadiq Mohamed, Dhahran (SA); Muhammad Ashraf Gondal, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/782,437

(22) Filed: Jul. 24, 2024

(51) Int. Cl.
*C25B 11/077* (2021.01)
*C25B 1/04* (2021.01)
*C25B 11/065* (2021.01)

(52) U.S. Cl.
CPC ............ *C25B 11/0771* (2021.01); *C25B 1/04* (2013.01); *C25B 11/065* (2021.01)

(58) Field of Classification Search
CPC . C25B 11/0771; C25B 11/065; C25B 11/077; C25B 11/075; C25B 11/073; C25B 11/051; C25B 11/052; C25B 11/059; C25B 11/067
See application file for complete search history.

(56) References Cited

U.S. PATENT DOCUMENTS

2020/0047162 A1  2/2020  Ramsundar et al.

FOREIGN PATENT DOCUMENTS

| CN | 109913896 A | 6/2019 |
| CN | 116065265 A | 5/2023 |
| CN | 117285083 A | 12/2023 |

OTHER PUBLICATIONS

Zulfiqar, Maria, Investigation of Photocatalytic and Antibacterial Study of Mo Doped ZnCo2O4/rGO Nanohybrid Under Visible Light, Aug. 10, 2023, Heliyon (Year: 2023).*

(Continued)

*Primary Examiner* — Luan V Van
*Assistant Examiner* — Mofoluwaso S Jebutu
(74) *Attorney, Agent, or Firm* — Oblon, McClelland, Maier & Neustadt, L.L.P.

(57) ABSTRACT

An electrode includes an electrically conductive substrate and a layer of a molybdenum-doped zinc/cobalt oxide ($ZnCo_{2-x}Mo_xO_4$). The surface of the electrically conductive substrate is at least partially covered by the layer of $ZnCo_{2-x}Mo_xO_4$, where x is a positive number equal to or less than about 0.1, and the layer of the $ZnCo_{2-x}Mo_xO_4$ includes spherical-shaped particles. The electrode has a Tafel slope from 75 millivolts per second (mV/s) to 115 mV/s, and a potential of 0.27 to 0.30 volts relative to the reversible hydrogen electrode ($V_{RHE}$) at a current density of about 50 mA/cm² for a duration of at least 40 hours.

20 Claims, 23 Drawing Sheets

(56) References Cited

OTHER PUBLICATIONS

Zein K. Heiba, Noura M. Farag, A. M. El-naggar, Mahmoud Abdellatief, A.M. Aldhafiri, Mohamed Bakr Mohamed, Effect of Mo-doping on the structure, magnetic and optical characteristics of nano CuCo2O4, Dec. 25, 2020, Journal of Materials Research and Technology, vol. 10, 2021, pp. 832-839 (Year: 2020).*

Kao-Pin Hwang, Hung-Chih Lin, Satoru Kaneko, Yu-Zhan Su and Ruei-Sung Yu, Material and Antibacterial Properties of Spinel-Structure Ca-Doped ZnCo2O4 Thin Films, Apr. 10, 2024, ECS J. Solid State Sci. Technol. 13 044003 (Year: 2024).*

Yang, Wen-Duo, et al., "Interface engineering of hybrid $ZnCo_2O_4@Ni_{2.5}Mo_8S_{8.7}$ structures for flexible energy storage and alkaline water splitting", Chemical Engineering Journal, vol. 454, Part 3, Feb. 15, 2023, 140456, 6 pages.

Lin, Yan-Gu, et al., "Cobalt-Phosphate-Assisted Photoelectrochemical Water Oxidation by Arrays of Molybdenum-Doped Zinc Oxide Nanorods", ChemSusChem—Chemistry-Sustainability-Energy-Materials. vol. 7, Issue 9. Jul. 8, 2014. pp. 2748-2754.

Lakhlifi, Hind, et al., "Synthesis of molybdates $Zn_{1-x}Co_xMoO_4$ ($0 \leq x \leq 1$), by decomposition of the precursors developed by the glycine-nitrate process (GNP), and their characterization", Materials Science in Semiconductor Processing, vol. 114, 2020, pp. 105054. 19 pages.

* cited by examiner

MOLYBDENUM-DOPED ZINC/COBALT OXIDE ELECTROCATALYST FOR HYDROGEN PRODUCTION

STATEMENT OF ACKNOWLEDGEMENT

Support provided by King Fahd University of Petroleum and Minerals (KFUPM), Saudi Arabia, through Project No. #H2FC2305, and King Abdullah City for Atomic and Renewable Energy (KACARE) is gratefully acknowledged.

BACKGROUND

Technical Field

The present disclosure is directed towards electrochemical water splitting, more particularly directed towards an electrode including an electrically conductive substrate and a layer of a molybdenum-doped zinc/cobalt oxide.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

A transition from non-renewable energy resources towards sustainable energy systems is needed to tackle the upcoming energy crisis. Burning fossil fuels causes environmental pollution, abrupt climate change, and global warming. Therefore, alternate energy conversion and storage strategies must be explored to harness renewable energy efficiently. Hydrogen ($H_2$) is a clean energy fuel. $H_2$ has a wide range of applications as a fuel and so may be an alternative to fossil fuels (See: C. Hu, L. Zhang, J. Gong, *Recent progress made in the mechanism comprehension and design of electrocatalysts for alkaline water splitting*). $H_2$ production in industries is hazardous to the environment due to the presence of poisoning agents such as sulfides, thus minimizing the use of $H_2$ in the fuel cell industry (See: T. Wang, L. Tao, X. Zhu, C. Chen, W. Chen, S. Du, Y. Zhou, B. Zhou, D. Wang, C. Xie, P. Long, W. Li, Y. Wang, R. Chen, Y. Zou, X. Z. Fu, Y. Li, X. Duan, S. Wang, *Combined anodic and cathodic hydrogen production from aldehyde oxidation and hydrogen evolution reaction*).

Presently, electrochemical water splitting is the most effective green technique for high-purity (>99.0%) $H_2$ production. Further, electrochemical water splitting is an efficient and reliable method as it is environmentally benign, economical, and facile. However, the rate of hydrogen evolution reaction (HER) from electrochemical water splitting depends on the efficiency of the electrodes, so developing efficient electrode materials is a necessity. Among the known electrodes, non-metal-based catalysts have the advantages of having a wide pH range and high catalytic activity with good stability. Furthermore, it is known that platinum (Pt) may be the best electrocatalyst for HER. However, due to their rarity and cost, noble metal catalysts are not used as electrocatalysts for large-scale applications. Hence, an economical, low overpotential, good electrochemical stability, and working under minimum potential replacement for noble metal electrocatalysts is required.

Transition metal oxides are economical, easily available, and have multivalence states, thereby having enhanced catalytic performance as electrode materials while maintaining cyclic stability. Further, transition metal oxides interact easily and frequently with water molecules. Among various metal oxides, spinel oxides have desirable activity, high electrochemical stability, and low electrical resistance and are available easily, economical, easy to synthesize, and less toxic. Spinel-structured oxides, such as cobalt oxide ($Co_3O_4$), manganese oxide ($Mn_3O_4$), and hematite ($Fe_3O_4$), provide various redox active sites and offer three-dimensional (3D) diffusion pathways to support HER. Furthermore, binary metal oxide electrocatalysts are more conductive than unitary metal oxide electrocatalysts (See: M. Hassan, Y. Slimani, M. A. Gondal, M. J. S. Mohamed, S. Guener, M. A. Almessiere, A. M. Surrati, A. Baykal, S. Trukhanov, A. Trukhanov, *Structural parameters, energy states and magnetic properties of the novel Se-doped $NiFe_2O_4$ ferrites as highly efficient electrocatalysts for HER*). Due to properties such as tunable electrocatalytic activity with the substitution of metals and high corrosion resistance, binary spinel oxides may be used in water electrolysis (See: K. Xiang, D. Wu, Y. Fan, W. You, D. Zhang, J. L. Luo, X. Z. Fu, *Enhancing bifunctional electrodes of oxygen vacancy abundant $ZnCo_2O_4$ nanosheets for supercapacitor and oxygen evolution*).

Cobalt (Co) based spinel oxide derivatives are known to enhance the water electrolysis process. $Co_3O_4$ is a magnetic spinel oxide with $Co^{2+}$ and $Co^{3+}$ ions occupying tetrahedral and octahedral sites in the geometric structure. The electrochemical features of $Co_3O_4$ may be tuned by replacing Co ions with other metal ions ($M^{2+}$ or $M^{3+}$) to obtain mixed metal cobalt oxide semiconductors. However, the performance of mixed metal cobalt oxides, such as zinc cobaltite ($ZnCo_2O_4$), cobalt ferrite ($FeCo_2O_4$), nickel cobaltite ($NiCo_2O_4$), and manganese cobalt oxide ($MnCo_2O_4$) as catalysts are not reliable (See: M. J. S. Mohamed, Y. Slimani, M. A. Gondal, M. A. Almessiere, A. Baykal, M. Hassan, A. Z. Khan, A. Roy, *Role of vanadium ions substitution on spinel $MnCo_2O_4$ towards enhanced electrocatalytic activity for hydrogen generation*). The catalytic activity of metal cobalt oxides may be improved by doping or compositing with other suitable impurity elements (See: X. Zhang, M. Jin, Q. Lian, O. Peng, S. Niu, Z. Ai, A. Amini, S. Song, C. Cheng, *Ion modification of transition cobalt oxide by soaking strategy for enhanced water splitting*). Tuning the specific surface area, and electronic band structure of the semiconductor materials by chemical doping of a heteroatom in the metal oxides crystal lattice enhances the electron charge transfer kinetics, electrical conductivity, and electrochemical active sites of the spinel oxides for the HER process (See: L. Pei, Y. Song, M. Song, P. Liu, H. Wei, B. Xu, J. Guo, J. Liang, *Mo-doping induced edge-rich cobalt iron oxide ultrathin nanomeshes as efficient bifunctional electrocatalysts for overall water splitting*).

Doping of molybdenum ion ($Mo^{6+}$) into the metal oxide crystal lattice improves the electronic structure of the 3D metal to draw the electrons for $Mo^{6+}$. The incorporation of $Mo^{6+}$ reduces the overpotential, and improves the catalytic active sites of the metal oxides, thereby enhancing the HER process (See: Y. Xiao, X. Chen, T. Li, Y. Mao, C. Liu, Y. Chen, W. Wang, *Mo-doped cobalt hydroxide nanosheets coupled with cobalt phosphide nanoarrays as bifunctional catalyst for efficient and high-stability overall water splitting*). A Mo-doped cobalt iron oxide for HER using a hydrothermal method has been made. The Mo-doped cobalt iron oxide exhibited 24 hours (h) of stability in an alkaline solution (See: L. Pei, Y. Song, M. Song, P. Liu, H. Wei, B. Xu, J. Guo, J. Liang, *Mo-doping induced edge-rich cobalt* iron oxide ultrathin nanomeshes as efficient bifunctional electrocatalysts for overall water splitting). The charge transfer kinetics of spinel metal oxides are enhanced by bulk and surface modification to reduce the recombination centers, thereby enhancing the HER process. Beibei and coworkers reported the synthesis of iron-phosphide (FeP) decorated nickel cobaltite ($NiCo_2O_4$) as a bifunctional electrocatalyst to increase the catalytic activity of $NiCo_2O_4$ by surface modification with FeP (See: B. He, G. Pan, Y. Deng, L. Zhao, H. Wang, R. Wang, Y. Gong, *Hierarchical iron-phosphide@NiCo₂O₄ nanoneedle arrays for high-performance water splitting*). The fabrication of Iridium (Ir) doped $NiCo_2O_4$ by replacing Ni and Co atoms with Ir at the octahedral sites, and the improvement in the catalytic activity was attributed to the oxygen vacancies formed due to Ir doping in the crystal lattice of $NiCo_2O_4$ has been reported (See: H. J. Lee, D. H. Park, W. J. Lee, S. B. Han, M. H. Kim, J. H. Byeon, K. W. Park, *Mesoporous spinel Ir-doped $NiCo_2O_4$ nanostructure as an efficient catalyst for oxygen evolution reaction*). The synthesis of cobalt ferrite ($FeCo_2O_4$) with nitrogen (N) doped carbon dots as an efficient binder-free electrocatalyst has been demonstrated. The catalytic performance of $FeCo_2O_4$ at N-doped carbon dots was significantly higher than that of undoped $FeCo_2O_4$, which was attributed to the higher number of active sites and better charge transfer in the doped spinel oxide (See: A. Kundu, A. I. Robby, A. Shit, H. J. Jo, S. Y. Park, *Construction of $FeCo_2O_4$@N-doped carbon dots nanoflowers as binder-free electrode for reduction and oxidation of water*). A V-doped $MnCo_2O_4$ microsphere to improve the charge transfer efficiency at the semiconductor electrolyte interface and stability for the HER process and found out that the improvement in charge transfer efficiency is due to the enhanced electrochemical surface area has been reported. Further, the electrocatalyst exhibits a high stability for 36 h (See: M. J. S. Mohamed, Y. Slimani, M. A. Gondal, M. A. Almessiere, A. Baykal, M. Hassan, A. Z. Khan, A. Roy, *Role of vanadium ions substitution on spinel $MnCo_2O_4$ towards enhanced electrocatalytic activity for hydrogen generation*). Presently, $ZnCo_2O_4$ is preferred to other Co-based binary spinel oxides such as Ni, copper (Cu), Mn, and Fe-based binary spinel oxides for water electrolysis. The spinel-structured $ZnCo_2O_4$ may be an economical electrocatalyst for water electrolysis in an alkaline medium. The $ZnCo_2O_4$ crystal structure has trivalent cobalt ions located at octahedral sites and is responsible for the active center for the water electrolysis process. The introduction of zinc ions replaces the $Co^{2+}$ and retains the catalytic activity of spinel cobalt oxide (See: Y. Zhu, Q. Lin, Y. Zhong, H. A. Tahini, Z. Shao, H. Wang, *Metal oxide-based materials as an emerging family of hydrogen evolution electrocatalysts*). $ZnCo_2O_4$ nanosheets have been prepared hydrothermally and been reduced by $NaBH_4$ treatment. The $NaBH_4$ treatment enhances the oxygen vacancies, which enhances the catalytic performance of the water oxidation process and achieves 324 milli volts (mV) overpotential for 10 milliamperes per square centimeter (mA cm$^{-2}$) (See: K. Xiang, D. Wu, Y. Fan, W. You, D. Zhang, J.-L. Luo, X.-Z. Fu, *Enhancing bifunctional electrodes of oxygen vacancy abundant $ZnCo_2O_4$ nanosheets for supercapacitor and oxygen evolution*). The effect of the doping element's electronegativity on the zinc cobaltite's water oxidation activity and demonstrated that $ZnCo_2O_4$ dopped with a less electronegative element such as sulfur is more active than $ZnCo_2O_4$ dopped with high electronegative element such as fluorine was studied (See: B. Xiong, L. Ge, X. Lei, Y. Wang, J. Yang, W. Li, X. Li, Z. Cheng, Z. Fu, Y. Lu, *Tailoring the electronic structure of $ZnCo_2O_4$ by incorporating anions with low electronegativity to improve the water oxidation activity*). $ZnCo_2O_4$ nanowires modified with a nanosheet of NiFe layered double hydroxide (NiFe LDH) to enhance the charge transfer efficiency for achieving low overpotential for the water oxidation process were reported (See: R. Que, S. Liu, Y. Yang, Y. Pan, *High catalytic performance of core-shell structure $ZnCo_2O_4$@NiFe LDH for oxygen evolution reaction*). Presently, $ZnCo_2O_4$-based catalysts are used in energy storage, oxygen evolution reactions, lithium-ion batteries, and gas sensors (See: D. Maity, K. Karmakar, D. Pal, S. Saha, G. G. Khan, K. Mandal, *One-dimensional p-$ZnCo_2O_4$/n-ZnO nanoheterojunction photoanode enabling photoelectrochemical water splitting*).

Although a plurality of methods for hydrogen production exist currently, an economically viable electrode with enhanced properties is still necessary to produce $H_2$ using electrochemical water splitting.

SUMMARY

In an exemplary embodiment, an electrode is described. The electrode includes an electrically conductive substrate and a layer of a molybdenum-doped zinc/cobalt oxide ($ZnCo_{2-x}Mo_xO_4$) at least partially covering a surface of the electrically conductive substrate, where x is a positive number equal to or less than about 0.1 and the layer of the $ZnCo_{2-x}Mo_xO_4$ includes spherical shaped particles.

In some embodiments, the electrically conductive substrate includes an indium tin oxide (ITO) glass, a fluorine dope tin oxide (FTO) glass, a silicone substrate, a graphite substrate, and a glassy carbon (GC) substrate.

In some embodiments, the electrically conductive substrate is a GC substrate.

In some embodiments, the spherical shaped particles of the $ZnCo_{2-x}Mo_xO_4$ have an average particle size of 2 micrometers (μm) to 10 μm.

In some embodiments, the spherical shaped particles of the $ZnCo_{2-x}Mo_xO_4$ includes a porous matrix of interconnected nanoneedles, and the interconnected nanoneedles have an average width of from 0.1 nanometers (nm) to 3 nm.

In some embodiments, the spherical shaped particles of the $ZnCo_{2-x}Mo_xO_4$ are aggregated.

In some embodiments, x is 0.06, and the electrode has an overpotential of about 195 millivolts relative to the reversible hydrogen electrode ($mV_{RHE}$) at a current density of about 10 milliamperes per square centimeter (mA/cm$^2$).

In some embodiments, x is 0.06, and the electrode has an overpotential of about 280 $mV_{RHE}$ at a current density of about 50 mA/cm$^2$.

In some embodiments, the electrode has a Tafel slope of from 75 millivolts per second (mV/s) to 115 mV/s.

In some embodiments, x is 0.06, and the electrode has a Tafel slope of about 81.4 mV/s.

In some embodiments, the electrode has a potential of 0.27 to 0.30 volts relative to the reversible hydrogen electrode ($V_{RHE}$) at a current density of about 50 mA/cm$^2$ for a duration of at least 40 hours.

In another exemplary embodiment, a method of making the electrode is described. The method includes preparing the $ZnCo_{2-x}Mo_xO_4$ by mixing and dissolving a Zn salt, a Co salt, a Mo salt, and urea in a solvent to form a mixture. The method further includes heating the mixture at a temperature of about 120 degrees Celsius (° C.) to form a precursor compound in the form of a precipitate, separating the precursor compound from the mixture, and calcining at a temperature of from 250 to 450° C.

In some embodiments, the Zn salt includes zinc acetylacetonate, zinc sulfate, zinc acetate, zinc citrate, zinc iodide, zinc chloride, zinc perchlorate, zinc nitrate, zinc phosphate, zinc triflate, zinc bis(trifluoromethanesulfonyl)imide, zinc tetrafluoroborate, zinc bromide, and/or its hydrate.

In some embodiments, the Co salt includes cobalt acetylacetonate, cobalt sulfate, cobalt acetate, cobalt citrate, cobalt iodide, cobalt chloride, cobalt perchlorate, cobalt nitrate, cobalt phosphate, cobalt triflate, cobalt bis(trifluoromethanesulfonyl)imide, cobalt tetrafluoroborate, cobalt bromide, and/or its hydrate.

In some embodiments, the Mo salt is ammonium molybdate.

In some embodiments, the calcining of the precursor compound is performed at a temperature of about 350° C. for 1 to 6 hours.

In some embodiments, the method of making the electrode further includes mixing the $ZnCo_{2-x}Mo_xO_4$, one or more solvents, and a sulfonated polymer to form a slurry, drop-casting the slurry onto a surface of the GC substrate to form a sample, and drying the sample.

In some embodiments, the $ZnCo_{2-x}Mo_xO_4$ is present on the surface of the GC substrate in an amount of from 0.25 to 0.32 milligrams per square centimeter ($mg/cm^2$) of a surface area of the GC substrate in contact with the slurry.

In yet another exemplary embodiment, a method for electrochemical water splitting is described. The method includes applying a potential between a counter and a working electrode in an electrochemical cell containing an electrolyte to form hydrogen and oxygen. The method further includes separately collecting $H_2$-enriched gas and $O_2$-enriched gas. The working electrode includes the electrode as described above. The electrolyte including an aqueous solution of a base at a concentration of 0.05 molar (M) to 5 M.

In some embodiments, the base is at least one selected from the group consisting of sodium hydroxide (NaOH), potassium hydroxide (KOH), lithium hydroxide (LiOH), barium hydroxide ($Ba(OH)_2$), and calcium hydroxide ($Ca(OH)_2$).

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
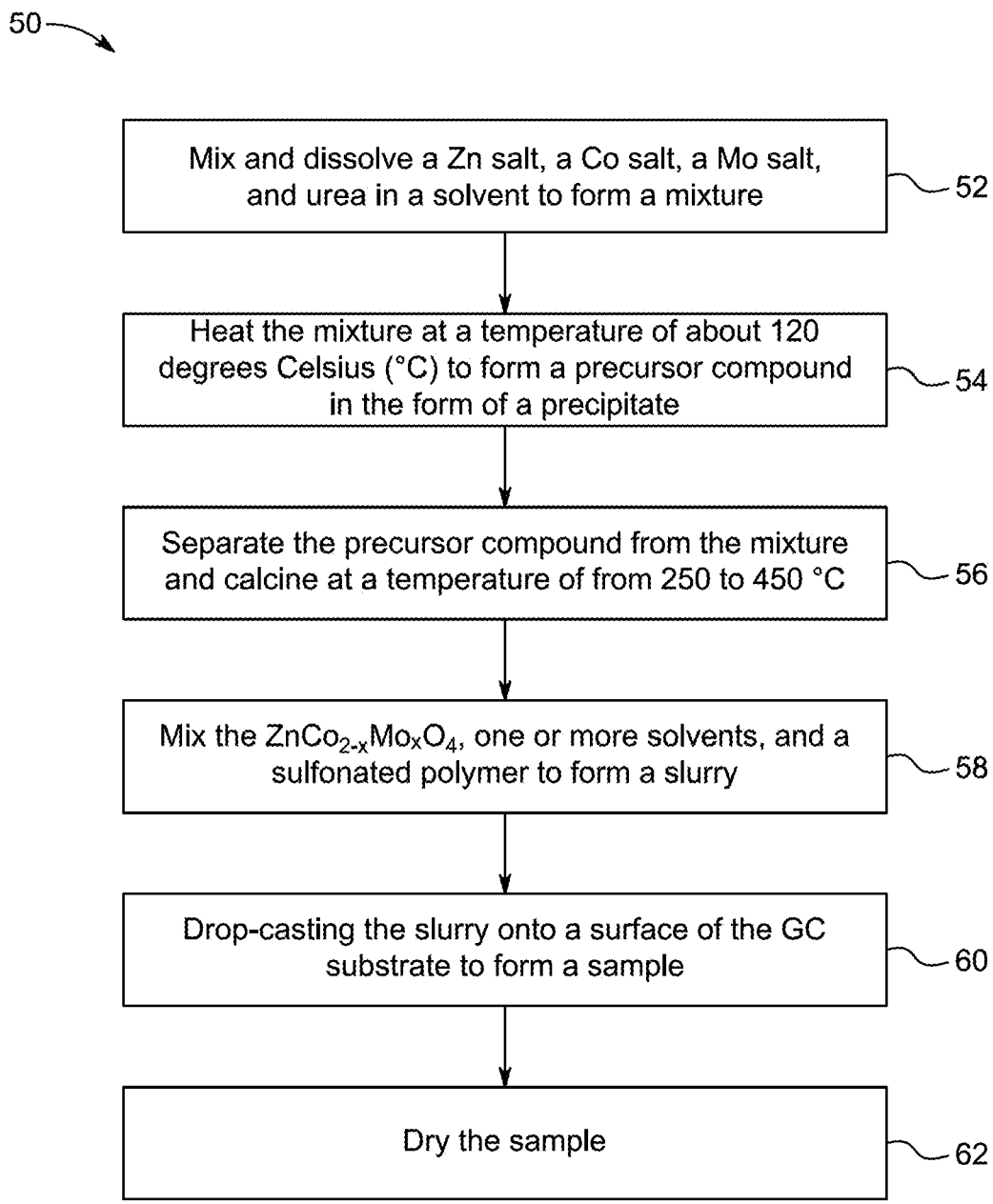
FIG. 1 is a flowchart depicting a method of making an electrode, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

In the drawings, like reference numerals designate identical or corresponding parts throughout the several views. Further, as used herein, the words "a", "an" and the like generally carry a meaning of "one or more," unless stated otherwise.

Furthermore, the terms "approximately", "approximate", "about", and similar terms generally refer to ranges that include the identified value within a margin of 20%, 10%, or preferably 5%, and any values therebetween.

The use of the terms "include", "includes", "including," "have," "has," or "having" should be generally understood as open-ended and non-limiting unless specifically stated otherwise.

As used herein, "nanoparticles" are particles having a particle size of 1 nm to 500 nm within the scope of the present invention.

As used herein, "particle size" and "pore size" may be thought of as the lengths or longest dimensions of a particle and of a pore opening, respectively.

As used herein, the term "room temperature" refers to a temperature range of "25° C.±3° C. in the present disclosure.

As used herein, the term "electrode" refers to an electrical conductor used to contact a non-metallic part of a circuit, such as a semiconductor, an electrolyte, a vacuum, or air.

As used herein, the term "current density" refers to the amount of electric current traveling per unit cross-section area.

As used herein, the term "Tafel slope" refers to the relationship between the overpotential and the logarithmic current density.

As used herein, the term "electrochemical cell" refers to a device capable of either generating electrical energy from chemical reactions or using electrical energy to cause chemical reactions.

As used herein, the term "water splitting" refers to the chemical reaction in which water is broken down into oxygen and hydrogen.

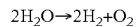

2H$_2$O→2H$_2$+O$_2$

As used herein, the term "overpotential" refers to the difference in potential that exists between a thermodynamically determined reduction potential of a half-reaction and the potential at which the redox event is experimentally observed. The term is directly associated with a cell's voltage efficacy. In an electrolytic cell, the occurrence of overpotential implies that the cell needs more energy as compared to that thermodynamically expected to drive a reaction. The quantity of overpotential is specific to each cell design and varies across cells and operational conditions, even for the same reaction. Overpotential is experimentally measured by determining the potential at which a given current density is reached.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of naturally occurring nickel $^{28}$Ni include $^{58}$Ni, $^{60}$Ni, $^{61}$Ni, $^{62}$Ni, and $^{64}$Ni. Isotopes of oxygen include $^{16}$O, $^{17}$O, and $^{18}$O, isotopes of cobalt (Co) are $^{56}$Co, $^{57}$Co, $^{58}$Co, and $^{60}$Co, and isotopes of molybdenum includes $^{81}$Mo, $^{82}$Mo, $^{83}$Mo, $^{84}$Mo, $^{85}$Mo, $^{86}$Mo, $^{87}$Mo, $^{88}$Mo, $^{89}$Mo, $^{90}$Mo, $^{91}$Mo, $^{92}$Mo, $^{93}$Mo, $^{94}$Mo, $^{95}$Mo, $^{96}$Mo, $^{97}$Mo, $^{98}$Mo, $^{99}$Mo, $^{100}$Mo, $^{101}$Mo, $^{102}$Mo, $^{103}$Mo, $^{104}$Mo, $^{105}$Mo, $^{106}$Mo, $^{107}$Mo, $^{108}$Mo, $^{109}$Mo, $^{110}$Mo, $^{111}$Mo, $^{112}$Mo, $^{113}$Mo, $^{114}$Mo, $^{115}$Mo, $^{116}$Mo, $^{117}$Mo, $^{118}$Mo, and $^{119}$Mo. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed to transition metal-based electrocatalysts, ZnCo$_{2-x}$Mo$_x$O$_4$ (x≤0.10), for hydrogen evolution reaction (HER) and their use for the water-splitting process. The electrocatalysts of the present disclosure were used as electrodes and were evaluated for their potential in the water-splitting process. The ZnCo$_{2-x}$Mo$_x$O$_4$ (x=0.06) electrocatalyst exhibited exceptional HER activity as evidenced by 195 mV overpotential, Tafel slope 81.4 mV s$^{-1}$, and high stability for 40 hours. The electrocatalyst of the present disclosure uses low-metal-cost materials for efficient and durable HER electrocatalysts.

The electrode of the present disclosure includes an electrically conductive substrate and a layer of a molybdenum-doped zinc/cobalt oxide ($ZnCo_{2-x}Mo_xO_4$) that at least partially covers the surface of the electrically conductive substrate. The electrically conductive substrate includes one selected from an indium tin oxide (ITO) glass, a fluorine dope tin oxide (FTO) glass, a silicone substrate, a graphite substrate, and a glassy carbon (GC) substrate. In a preferred embodiment, the electrically conductive substrate is a GC substrate. The GC substrate may have a thickness in a range of about 10 micrometers (μm) to 140 μm, for example, ranging from about 20 μm to about 120 μm, from about 50 μm to about 100 μm, from about 70 μm to about 95 μm, or from about 85 μm to about 90 μm, including all ranges and sub-ranges therebetween.

The $ZnCo_{2-x}Mo_xO_4$ particles may be dispersed on the surface of the substrate using a technique like the drop-casting, spray coating, spin coating, dip coating, hydrothermal growth, or aerosol-assisted chemical vapor deposition (AACVD), preferably drop-casting. The $ZnCo_{2-x}Mo_xO_4$ particles are distributed on the surface of the GC substrate such that at least 50%, preferably 55%, preferably 60%, preferably 65%, preferably 70%, preferably 75%, preferably 80%, preferably 85%, preferably 90%, and preferably >95% of the syrface of the substrate is covered with $ZnCo_{2-x}Mo_xO_4$ particles.

The 'x' in $ZnCo_{2-x}Mo_xO_4$ is a positive number equal to or less than about 0.1. In some embodiments, the 'x' is about 0.02, about 0.04, about 0.06, and about 0.08. In a preferred embodiment, 'x' is 0.06. The $ZnCo_{2-x}Mo_xO_4$ particles are spherical in shape and have an average particle size of 2 micrometers (μm) to 10 μm, preferably 2 μm, preferably 3 μm, prefearbly 4 μm, prefearbly 5 μm. The spherical-shaped particles of the $ZnCo_{2-x}Mo_xO_4$ include a porous matrix of interconnected nanoneedles, with an average width of 0.1 nanometers (nm) to 3 nm. In some embodiments, the spherical-shaped particles of the $ZnCo_{2-x}Mo_xO_4$ are aggregated.

In alternate embodiments, the $ZnCo_{2-x}Mo_xO_4$ particles may have different morphologies, such as nanowires, nanorods, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc. and mixtures thereof.

The $ZnCo_{2-x}Mo_xO_4$ particles, when x=0.06, preferably comprises 20-35 wt. % of oxygen, preferably 21-34 wt. %, preferably 22-33 wt. %, preferably 23-32 wt. %, preferably 24-31 wt. %, prefearbly 25-30 wt. %, preferably 26-29 wt. %, preferably 27-29 wt. %, preferably 28-29 wt. %; 40-50 wt. % of cobalt, prefearbly 41-49 wt. %, preferably 42-48 wt. %, preferably 43-47 wt. %, preferably 44-47 wt. %, prefearbly 46-47 wt. % of oxygen; preferably 20-30 wt. % of zinc, preferably 21-27 wt. %, preferably 22-25 wt. %, preferably 23-24 wt. % of zinc; and 1-5 wt. % of molybdenum, preferably 1.5-3 wt. %, preferably 1.5-2 wt. % of molybdenum.

Referring to FIG. 1, a schematic flow diagram of a method 50 of making $ZnCo_{2-x}Mo_xO_4$ is illustrated. The order of the steps of the method 50 is not intended to be construed as a limitation, and any number of the described method steps may be combined in any order to implement the method 50. Additionally, individual steps may be removed or skipped from the method 50 without departing from the spirit and scope of the present disclosure.

At step 52, the method 50 includes mixing and dissolving a Zn salt, a Co salt, a Mo salt, and urea in a solvent to form a mixture. In some embodiments, the cobalt salt includes one or more selected from cobalt acetylacetonate, cobalt sulfate, cobalt acetate, cobalt citrate, cobalt iodide, cobalt chloride, cobalt perchlorate, cobalt nitrate, cobalt phosphate, cobalt triflate, cobalt bis(trifluoromethanesulfonyl)imide, cobalt tetrafluoroborate, cobalt bromide, and/or its hydrate. Preferably, the cobalt in the cobalt salt has a +2 oxidation state, though in an alternative embodiment, cobalt having a different oxidation state, such as +3, may be used. In one embodiment, the cobalt of the cobalt salt consists essentially of cobalt in a +2 oxidation state. As defined here, the cobalt "consisting essentially of cobalt in a +2-oxidation state" means that at least 95 wt. %, preferably at least 99.wt %, more preferably at least 99.5 wt. % of the cobalt, has a +2 oxidation state relative to the total weight of the cobalt. Preferably, the cobalt salt may be in any hydration state; for instance, $Co(NO_3)_2$ includes both $Co(NO_3)_2$ and $Co(NO_3)_2 \cdot 6H_2O$. In a preferred embodiment, the cobalt salt is $Co(NO_3)_2$. Suitable examples of the zinc salt include one or more selected from zinc acetylacetonate, zinc sulfate, zinc acetate, zinc citrate, zinc iodide, zinc chloride, zinc perchlorate, zinc nitrate, zinc phosphate, zinc triflate, zinc bis (trifluoromethanesulfonyl)imide, zinc tetrafluoroborate, zinc bromide, and/or its hydrate. Suitable examples of Mo salt include, but not limited to, ammonium heptamolybdate(VI), ammonium heptamolybdate(VI) tetrahydrate, ammonium molybdate(VI), ammonium phosphomolybdate, ammonium tetrathiomolybdate, sodium molybdate(VI), lithium molybdate(VI), molybdenum(VI) dichloride dioxide, and mixtures and hydrates thereof. In certain embodiments, a molybdenum salt having a different oxidation state, such as +2 (e.g., molybdenum(II) carboxylates), +3 (e.g., molybdenum(III) chloride), +4 (e.g., molybdenum(IV) carbonate), and +5 (e.g., molybdenum(V) chloride). In a preferred embodiment, the Mo salt is ammonium molybdate. The weight ratio of the cobalt salt to the zinc salt is in the range of 1:5 to 5:1, preferably 1:4 to 4:1, preferably 1:3 to 3:1, preferably 1:2 to 2:1, preferably 1:1. In a most preferred embodiment, the weight ratio of the Co salt to the Zinc salt is 2:1. The mixing may be preferably be carried out at room temperature, for 10-60 minutes, preferably 20-50 minutes, preferably 20-30 minutes, preferably 20 minutes.

The Co salt, Zn salt, Mo salt, and urea are mixed in a solvent to form a mixture. Mixing may occur via stirring, shaking, swirling, sonicating, blending, or by otherwise agitating a mixture. In one embodiment, the mixture is stirred by a magnetic stirrer or an overhead stirrer. In another embodiment, the mixture is left to stand (i.e. not stirred). The molar concentration of urea is in the range of 1-5 M, preferably 1-3 M, preferably 1 M. The solvent may be water, an alcohol such as methanol and ethanol, or a mixture thereof. In one or more embodiments, the solvent is water, preferably deionized or distilled water.

At step 54, the method 50 includes heating the mixture at a temperature of about 120 degrees Celsius (° C.) to form a precursor compound in the form of a precipitate. The mixture may be hydrothermally treated to form a precipitate. In one embodiment, the mixture is hydrothermally treated via heating in an autoclave at 50-150° C., preferably 120° C., for 6-24 hours, preferably 6-12 hours, more preferably 8 to produce the precursor compound. An external heat source, such as an oven, a heating mantle, a water bath, or an oil bath, may be employed to heat the mixture.

At step 56, the method 50 includes separating the precursor compound from the mixture and calcining at a temperature from 250 to 450° C. The precursor compound may be separated from the precipitate via centrifugation/filtration. After separation, the precursor compound may be washed with water/alcohol (ethanol) and calcined to form the $ZnCo_{2-x}Mo_xO_4$ particles. The precursor compound was further calcined at a temperature range of 250 to 450° C., preferably 300-400° C., preferably 350-375° C., or about 300° C. for 0.5-8 hours, preferably 1-6 hours, preferably 2-4 hours, or about 3 hours to form the $ZnCo_{2-x}Mo_xO_4$ particles (electrocatalyst). Calcination can be carried out within shaft furnaces, rotary kilns, multiple hearth furnaces, and/or fluidized bed reactors. In some embodiments, the precursor compound is calcined at a temperature of about 350° C. for 1 to 6 hours to obtain $ZnCo_{2-x}Mo_xO_4$. The $ZnCo_{2-x}Mo_xO_4$ particles obtained may be used to prepare the electrode via the steps described below.

At step 58, the method 50 includes mixing the $ZnCo_{2-x}Mo_xO_4$, one or more solvents, and a sulfonated polymer to form a slurry. The solvents may be one or more selected from water, ethanol, isopropyl alcohol, acetone, N, N-dimethylacetamide, 1-methyl-2-pyrrolidinone, 1,3-dioxolane, 2-methoxy ethanol, or benzyl alcohol. In a preferred embodiment, the solvent includes a combination of water and ethanol, with water and ethanol preferably in a v/v ratio of 1:5 to 5:1, preferably 4:1 to 1:4, preferably 4:1. The sulfonated polymer serves as a binder that binds the $ZnCo_{2-x}Mo_xO_4$ particles to a substrate. Suitable examples of sulfonated polymer include one or more selected from sulfonated tetrafluoroethylene-based fluoropolymer-copolymer, sulfonated polyetheretherketone (SPEEK), sulfonated polysulfone (SPSF), sulfonated polysulfideulfone (SPSS). In a preferred embodiment, the sulfonated polymer is Nafion (sulfonated tetrafluoroethylene-based fluoropolymer-copolymer). Optionally, other binders may be used as well—for example, poly(diallyl amine), diallyl ketone, diallyl amine, styryl sulfonate, vinyl lactam, laponite, polygorskites (such as attapulgite, sepiolite), and combinations thereof.

At step 60, method 50 includes drop-casting the slurry onto the surface of the GC (glassy carbon) substrate to form a sample. Optionally, other substrates such as stainless steel, aluminum, nickel, copper, platinum, zinc, tungsten, titanium, and carbon may be used as well. The $ZnCo_{2-x}Mo_xO_4$ particles are drop-casted on the GC substrate such that 0.25 milligrams per square centimeter ($mg/cm^2$) to 0.32 $mg/cm^2$ of a surface area of the GC substrate in contact with the slurry. Drop casting is a typically used for forming small coatings on small surfaces. It requires only a small amount of solvent. In this method, the slurry is dripped onto the substrate as drops and allowed to dry without spreading. Alternate techniques for depositing the catalyst on the substrate include spray coating, spin coating, and dip coating.

At step 62, the method 50 includes drying the sample, preferably at room temperature for 1-6 hours, preferably 2-4 hours, preferably 3 hours, to form the electrode.

The electrode of the present disclosure has a potential of 0.27 to 0.30 volts relative to the reversible hydrogen electrode ($V_{RHE}$) at a current density of about 50 $mA/cm^2$ for a duration of at least 40 hours. In some embodiments, the electrode including $ZnCo_{2-x}Mo_xO_4$, when x is 0.06, has an overpotential of about 195 millivolts (mV) relative to the reversible hydrogen electrode ($mV_{RHE}$) at a current density of about 10 milliamperes per square centimeter ($mA/cm^2$). In some embodiments, when x is 0.06, the electrode has an overpotential of about 280 $mV_{RHE}$ at a current density of about 50 $mA/cm^2$. The electrode has a Tafel slope of from 75 millivolts per second (mV/s) to 115 mV/s. In a specific embodiment, when x is 0.06 in $ZnCo_{2-x}Mo_xO_4$, the electrode has a Tafel slope of about 81.4 mV/s.

A method of generating hydrogen via electrochemical water splitting with the electrode is described. The method includes applying a potential of 0.1 to 2.0 volts (V), preferably 0.2-1.9 V, preferably 0.3-1.8 V, preferably 0.4-1.7 V, preferably 0.5-1.6 V, preferably 0.6-1.5 V, preferably 0.7-1.4 V, preferably 0.8-1.3 V, preferably 0.9-1.2 V, and preferably 1.0-1.1 V, to an electrochemical cell. The electrochemical cell includes a counter electrode and an electrocatalyst (working electrode. In some embodiments, the counter electrode includes at least one of graphite and platinum. In alternate embodiments, the counter electrode is made from a material selected from the group consisting of platinum, gold, and carbon. In alternate embodiments, the counter electrode may contain an electrically-conductive material such as platinum, platinum-iridium alloy, iridium, titanium, titanium alloy, stainless steel, gold, cobalt alloy, and/or some other electrically-conductive material, where an "electrically-conductive material" as defined here is a substance with an electrical resistivity of at most $10^{-6}\Omega \cdot m$, preferably at most $10^{-7}\Omega \cdot m$, more preferably at most $10^{-8}\Omega \cdot m$ at a temperature of 20-25° C. The form of the counter electrode may be generally relevant only in that it needs to supply sufficient current to the electrolyte solution to support the current required for the electrochemical reaction of interest. The counter electrode material should thus be sufficiently inert to withstand the chemical conditions in the electrolyte solution, such as acidic or basic pH values, without substantially degrading during the electrochemical reaction. The counter electrode should preferably not leach out any chemical substance that interferes with the electrochemical reaction or might lead to undesirable electrode contamination. In a preferred embodiment, the counter electrode is graphite.

In one embodiment, the electrochemical cell further includes a reference electrode in contact with the electrolyte solution. A reference electrode is an electrode that has a stable and well-known electrode potential. The high stability of the electrode potential is usually reached by employing a redox system with constant (buffered or saturated) concentrations of each relevant species of the redox reaction. A reference electrode may enable a potentiostat to deliver a stable voltage to the working electrode or the counter electrode. The reference electrode may be a standard hydrogen electrode (SHE), a normal hydrogen electrode (NHE), a reversible hydrogen electrode (RHE), a saturated calomel electrode (SCE), a copper-copper(II) sulfate electrode (CSE), a silver chloride electrode (Ag/AgCl), a pH-electrode, a palladium-hydrogen electrode, a dynamic hydrogen electrode (DHE), a mercury-mercurous sulfate electrode, mercury/mercuric oxide (Hg/HgO) electrode, or some other type of electrode. In a preferred embodiment, a reference electrode is an Ag/AgCl electrode. However, in some embodiments, the electrochemical cell does not include a third electrode.

In some embodiments, the electrochemical cell is at least partially submerged in an electrolyte, preferably 50%, preferably 60%, or more preferably at least 70%. In some embodiments, the aqueous solution includes water and a base. The water may be tap water, distilled water, bidistilled water, deionized water, deionized distilled water, reverse osmosis water, and/or some other water. In some embodiments, the electrolyte includes the aqueous solution of the base at a concentration of 0.05-0.5 M, preferably 0.1-0.45 M, preferably 0.15-0.4 M, preferably 0.2-0.35 M, and preferably 0.25-0.3 M. In a preferred embodiment, the electrolyte includes the aqueous solution of a base at a concentration of 1 M. In some embodiments, the base is at least one selected from the group consisting of sodium hydroxide (NaOH), potassium hydroxide (KOH), lithium hydroxide (LiOH), barium hydroxide (Ba(OH)$_2$), calcium hydroxide (Ca(OH)$_2$). In an alternative embodiment, an organic base may be used, such as sodium acetate and potassium acetate. In a preferred embodiment, the base is KOH. Preferably, to maintain uniform concentrations and/or temperatures of the electrolyte solution, the electrolyte solution may be stirred or agitated during the step of the subjecting. The stirring or agitating may be done intermittently or continuously. This stirring or agitating may be done by a magnetic stir bar, a stirring rod, an impeller, a shaking platform, a pump, a sonicator, a gas bubbler, or some other device. Preferably, the stirring is done by an impeller or a magnetic stir bar.

The method further includes separately collecting H$_2$-enriched gas and O$_2$-enriched gas. The oxygen may be generated by decomposing water into H$_2$ and O$_2$. In one embodiment, the space above each electrode may be confined to a vessel to receive or store the evolved gases from one or both electrodes. The collected gas may be further processed, filtered, or compressed. Preferably, the H$_2$-enriched gas is collected above the cathode, and the O$_2$-enriched gas is collected above the anode. The electrolytic cell, or an attachment, may be shaped so that the headspace above the working electrode is kept separate from the headspace above the reference electrode. In one embodiment, the H$_2$-enriched gas and the O$_2$-enriched gas are not 100 vol % H$_2$ and 100 vol % O$_2$, respectively. For example, the enriched gases may also include N$_2$ from the air, water vapor, and other dissolved gases from the electrolyte solution. The H$_2$-enriched gas may also include O$_2$ from the air. The H$_2$-enriched gas may include greater than 20 vol % H$_2$, preferably greater than 40 vol % H$_2$, more preferably greater than 60 vol % H$_2$, and even more preferably greater than 80 vol % H$_2$, relative to a total volume of the receptacle collecting the evolved H$_2$ gas. The O$_2$-enriched gas may include greater than 20 vol % O$_2$, preferably greater than 40 vol % O$_2$, more preferably greater than 60 vol % O$_2$, and even more preferably greater than 80 vol % O$_2$, relative to a total volume of the receptacle collecting the evolved O$_2$ gas. In some embodiments, the evolved gases may be bubbled into a vessel, including water or some other liquid, and higher concentrations of O$_2$ or H$_2$ may be collected. In one embodiment, evolved O$_2$ and H$_2$, or H$_2$-enriched gas and O$_2$-enriched gas, may be collected in the same vessel.

The electrocatalyst of the present disclosure may also be used in water-splitting reactions. In some embodiments, the electrocatalyst may also be used in the field of batteries, fuel cells, photochemical cells, water splitting cells, electronics, water purification, hydrogen sensors, semiconductors (such as field-effect transistors), magnetic semiconductors, capacitors, data storage devices, biosensors (such as redox protein sensors), photovoltaics, liquid crystal screens, plasma screens, touch screens, OLEDs, antistatic deposits, optical coatings, reflective coverings, anti-reflection coatings, and/or reaction catalysis.

EXAMPLES

The following examples demonstrate molybdenum-doped zinc/cobalt oxide electrocatalyst as described herein. The examples are provided solely for illustration and are not to be construed as limitations of the present disclosure, as many variations thereof are possible without departing from the spirit and scope of the present disclosure.

Example 1: Chemicals

Zinc nitrate (98.0%), cobalt (II) nitrate (98.0%), ammonium molybdate (99.0%), and urea were obtained from Sigma-Aldrich. The chemicals used are analytical grades and utilized with no additional purification.

Example 2: Preparation of Bare and Mo-Doped ZnCo$_2$O$_4$

The molybdenum-doped zinc/cobalt oxide (ZnCo$_{2-x}$Mo$_x$O$_4$ (x≤0.10)) was prepared by hydrothermal method followed by calcination processes. ZnCo$_2$O$_4$ was synthesized by mixing 2.98 grams (g) of zinc nitrate and 5.82 g of cobalt (II) nitrate with 1.0 M urea in 50 milliliters (mL) deionized (DI) water while stirring for 20 minutes at room temperature to form a solution. The solution was transferred to the 100 mL Teflon lined stainless-steel autoclave. The autoclave was closed and heated at 120 degrees Celsius (° C.) for 8 hours (h). The autoclave was then cooled to room temperature, and the powder from the solution was washed with DI water and ethanol and gathered by a centrifugation process. The resulting powder was dried at 60° C. overnight and calcinated at 350° C. in ambient environment for 3 h. Further ZnCo$_{2-x}$Mo$_x$O$_4$ (x≤0.10, where x=0.00, 0.02, 0.04, 0.06, 0.08, and 0.10) were prepared by adding a specific amount of ammonium molybdate following the same procedure.

Example 3: Physicochemical Characterization

The lattice structural information of the ZnCo$_{2-x}$Mo$_x$O$_4$, (x≤0.10) phase was investigated using an X-ray diffractometer (XRD) (wavelength (λ)=1.54059 angstrom (A)). The morphology of ZnCo$_{2-x}$Mo$_x$O$_4$, was examined by transmission electron microscopy (TEM) and scanning electron microscopy (SEM) attached to the energy-dispersive X-ray (EDX) module. The chemical compositions and oxidation states of the elements in ZnCo$_{2-x}$Mo$_x$O$_4$ were studied using an X-ray photoelectron spectroscopy (XPS) instrument, where CIs peak at 284.8 eV is used as a reference to calibrate the XPS spectra. The first-principles calculations were conducted using the density functional theory (DFT) using DFT-based Quantum ATK software.

Example 4: Electrochemical Procedure

A three-electrode cell Metrohm AutoLab PGSTAT302N potentiostat in 1.0 molar (M) potassium hydroxide (KOH) electrolyte with a pH of 13.6 was used to evaluate the hydrogen evolution reaction (HER) performance of the ZnCo$_{2-x}$Mo$_x$O$_4$ (x≤0.10) electrocatalyst. The working electrode was a 3 millimeters (mm) diameter glassy carbon (GC) electrode. Silver/silver chloride (Ag/AgCl) (3.5 M potassium chloride (KCl) solution) and platinum were used as reference electrodes and counter electrodes in the chemical cell. The electrolyte was bubbled with nitrogen (N$_2$) for 30 minutes before the electrochemical measurements. In the case of ZnCo$_{2-x}$Mo$_x$O$_4$ (x=0.06), the surface of the GC working electrode was modified with the electrocatalyst by drop casting 10 microliters (μL) of an ink and drying them at room temperature for 3 hours in a fume hood to achieve a catalyst loading of 0.285 milligrams per square centimeter (mg cm$^{-2}$). The ink was prepared by dispersing 4.0 milligrams (mg) of material in a 1.0 mL mixture of 80% water and 20% ethanol with 80 microliters (μL) of Nafion solution (5 wt. %), which was then ultrasonicated for 30 minutes. Further, the catalytic performance of the electrodes was evaluated using linear sweep voltammetry (LSV) with a scan rate of 5 millivolts per second (mV s$^{-1}$) in 1.0 M KOH solution. The measured voltage was adapted to the reversible hydrogen electrode (RHE) by using the below-mentioned equation:

$$E_{RHE}=E_{applied}^0+0.0591\times pH+E_{Ag/AgCl}$$

The Tafel slopes were calculated according to the below mentioned Tafel equation.

$$(\eta=a+b\ \log(j))$$

Electrochemical impedance spectroscopy (EIS) measurements were performed from $10^{-1}$ (hertz) Hz to $10^5$ Hz with 10 millivolt (mV) amplitude using the same Autolab: PGSTAT302N potentiostat equipped with a FRA32 M module. The electrochemically active surface area (ECSA) of the representative electrodes was calculated by measuring a cyclic voltammetry (CV) in a non-faradic region (0.21 to 0.31 $V_{Ag/AgCl}$) at different scan rates (40, 60, 80, 100, 120, 140, 160, and 180 mV s$^{-1}$). The difference in current density variation ($\Delta j=j_a-j_c$) at an applied potential of 0.28 $V_{RHE}$ was plotted against the scan rate to estimate the electrochemical double-layer capacitance ($C_{dl}$), which was further used to calculate the ECSA. The ECSA of the representative electrodes were evaluated by the below mentioned equation.

$$A_{ECSA}=C_{dl}/C_s$$

where specific capacitance ($C_s$)=0.04 microfarad per square centimeter (mF cm$^{-2}$).

Further, the roughness factor was calculated using the below mentioned equation.

$$RF=ECSA/A_{geometric}.$$

Furthermore, the specific activity (SA) in milliamperes per square centimeter (mA cm$^{-2}$) was calculated by ECSA using the below mentioned equation.

$$SA=j/ECSA$$

where j is the cathodic current at an overpotential of 300 millivolts (mV). The surface-active sites (N) of the represented electrodes were evaluated by measuring the CV at 60 millivolts per second (mV s$^{-1}$) in 1.0 molar (M) potassium hydroxide (KOH) electrolyte solution. The integrated charge of each electrode was divided by 2 by assuming a one-electron redox process to obtain surface charge density ($Q_S$). The value of N was computed by below mentioned equation.

$$N=Q_S/F$$

The exchange current density ($I_{ex}$) values of representative electrodes were determined. Chronoamperometric measurements were performed at a current density of 10 mA cm$^{-2}$ and 50 mA cm$^{-2}$ to assess the stability and durability of the ZnCo$_{2-x}$Mo$_x$O$_4$ (x=0.06) electrode. The linear sweep voltammetry was repeated for 1000 cycles to evaluate the cyclic performance of the electrodes.

Example 5: Phase Analysis

Figure 2A:
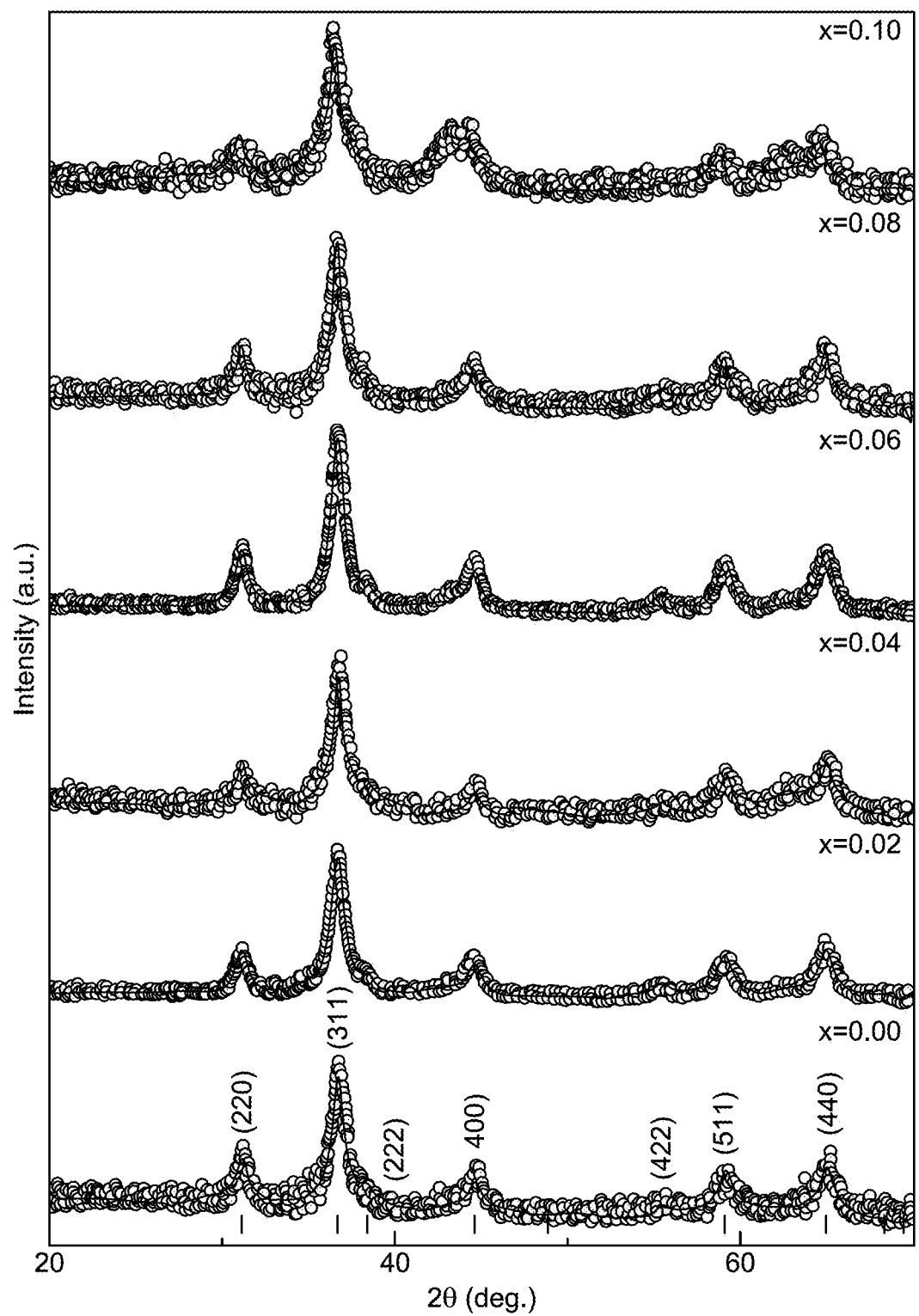
FIG. 2A is an image of an X-ray powder pattern of molybdenum-doped zinc/cobalt oxide ($ZnCo_{2-x}Mo_xO_4$ (x≤0.10)), according to certain embodiments.
Figure 2B:
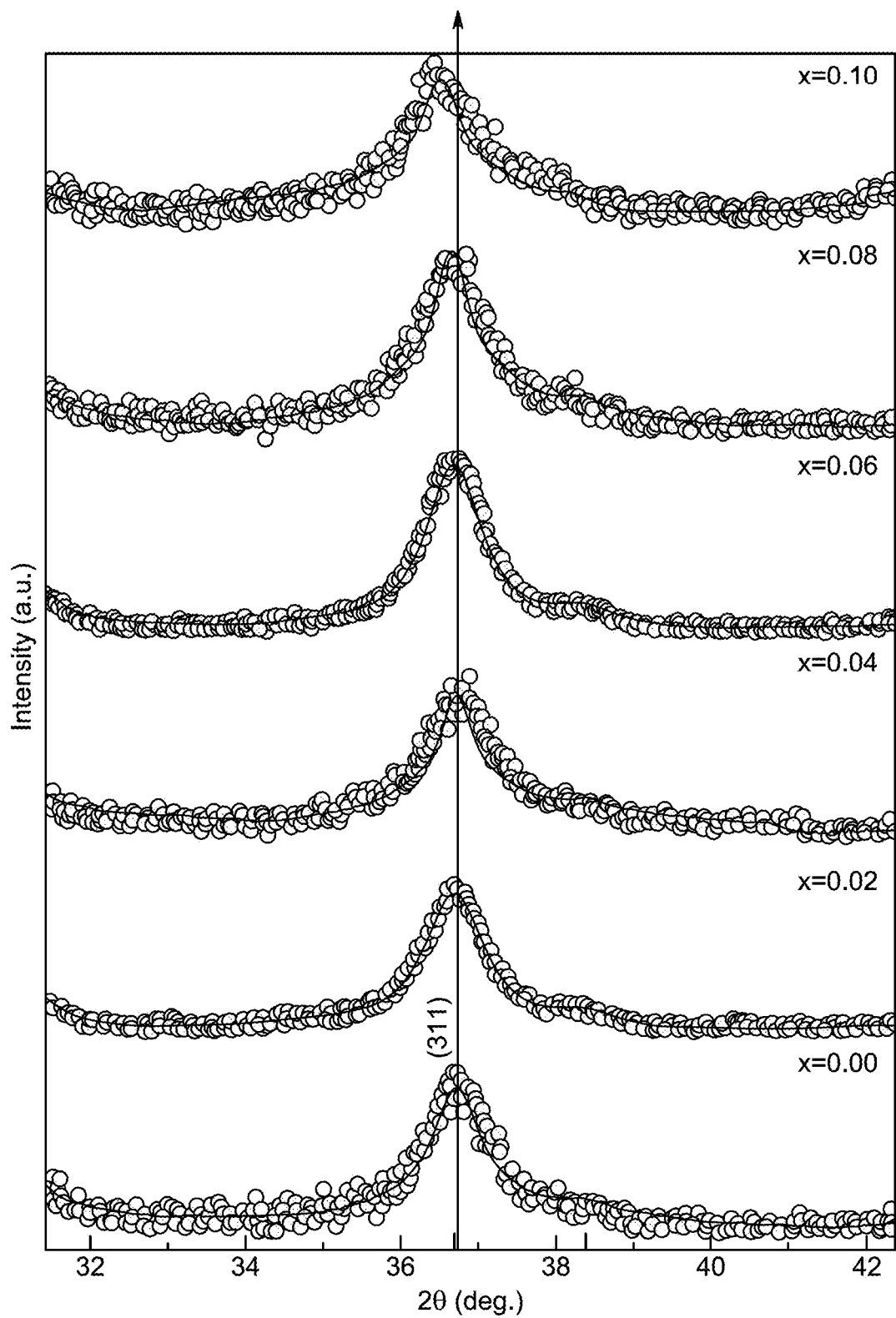
FIG. 2B is an enlarged image of an X-ray powder pattern of $ZnCo_{2-x}Mo_xO_4$ (x≤0.10), according to certain embodiments.

The cryptography analysis of the composition and purity of the catalysts ZnCo$_{2-x}$Mo$_x$O$_4$ (x≤0.10) and bare ZnCo$_2$O$_4$ were characterized through an X-ray powder pattern using an X-ray diffractometer (XRD) as shown in FIG. 2A and FIG. 2B. The XRD pattern exhibited the characteristic peaks of cubic Zn—Co spinel oxide (ZnCo$_2$O$_4$) without undesired phase or external change. The small crystal size of all the samples was confirmed by the broadened peaks. Further, the shifts of the most intense peak (311) toward the lower angle led to an increase in the lattice parameters. These findings confirmed the effectively synthesized Zn—Co. The lattice parameters, crystal size, and cell volume Rietveld referment fitting utilizing Match 3 and the data are listed in Table 1. As seen from Table 1, value lattice parameters (a) increase with the increase in Mo ratio. This is due to the expansion in lattice caused by the difference in ionic radii between Mo and Co. The crystallite size, which was found out using Scherrer's equation, showed slight variation when the Mo amount is increased in the 10 nanometers (nm) to 14 nm range. Further, the cation distribution of the ZnMo$_x$Co$_{2-x}$O$_4$ spinel system was determined using the Bertaut method based on X-ray diffraction. The ratios of XRD intensities from the $I_{220}/I_{440}$ and $I_{422}/I_{400}$. Due to the sensitivity to cation distribution, crystallographic planes were utilized in the calculations. The resulting cation distribution for ZnMo$_x$Co$_{2-x}$O$_4$ is provided in Table 1. It is known that Co ions exist in both 3$^+$ and 2$^+$ oxidation states to maintain the stoichiometry of the compound. Most Co ions are situated in octahedral sites, while Zn ions primarily occupy the tetrahedral A-sites. With the introduction of Mo ions, the percentage of Co ions decreased, and the rare-earth Mo ions occupied the octahedral B-sites.

TABLE 1

Structural parameters of ZnCo$_{2-x}$Mo$_x$O$_4$ (x ≤ 0.10).

| | | | $D_{XRD}$ | | | Cation distribution | |
|---|---|---|---|---|---|---|---|
| x | a (Å) | V (Å$^3$) | (nm) ± 0.03 | $\chi^2$ | $R_{Bragg}$ | Tetrahedral A-site | Octahedral B-site |
| 0.00 | 8.1167 | 534.7368 | 12.4 | 1.0 | 10.7 | Zn$_{0.9}$Co$_{0.1}$ | Zn$_{0.1}$Co$_{1.9}$ |
| 0.02 | 8.1176 | 534.9049 | 11.8 | 3.2 | 35.8 | Zn$_{0.9}$Co$_{0.1}$ | Zn$_{0.1}$Mo$_{0.02}$Co$_{1.88}$ |
| 0.04 | 8.1177 | 534.9246 | 12.5 | 1.4 | 27.0 | Zn$_{0.9}$Co$_{0.1}$ | Zn$_{0.1}$Mo$_{0.04}$Co$_{1.86}$ |
| 0.06 | 8.1319 | 537.7526 | 14.5 | 1.5 | 32.8 | Zn$_{0.9}$Co$_{0.1}$ | Zn$_{0.1}$Mo$_{0.06}$Co$_{1.84}$ |
| 0.08 | 8.1458 | 540.5029 | 10.3 | 1.3 | 31.6 | Zn$_{0.9}$Co$_{0.1}$ | Zn$_{0.1}$Mo$_{0.08}$Co$_{1.82}$ |
| 0.10 | 8.1616 | 543.6582 | 11.1 | 1.6 | 31.3 | Zn$_{0.9}$Co$_{0.1}$ | Zn$_{0.1}$Mo$_{0.1}$Co$_{1.8}$ |

Example 6: Morphological Analysis

Figure 3A:
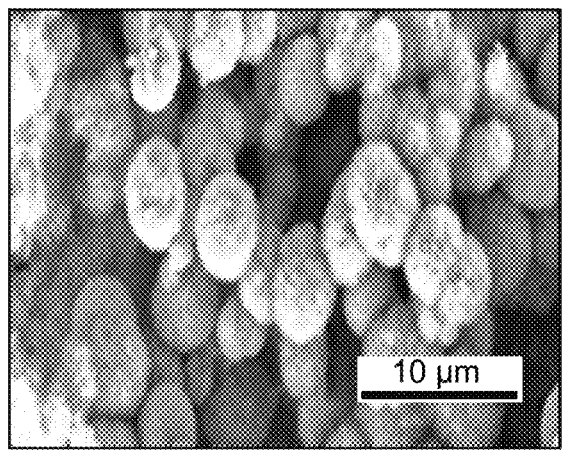
FIGS. 3A-3C is a scanning electron microscopy (SEM) image of $ZnCo_{2-x}Mo_xO_4$ at different magnifications, according to certain embodiments.
Figure 3B:
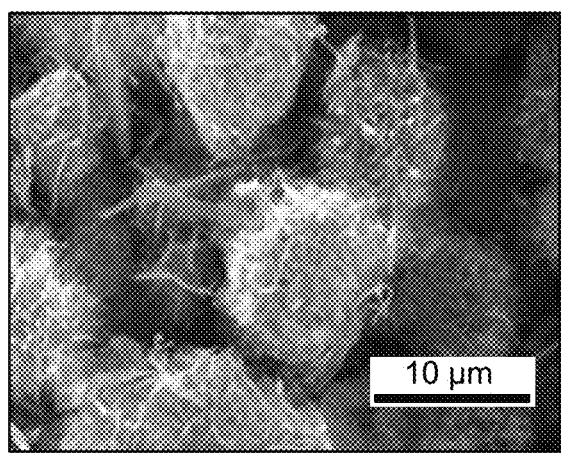
Figure 3C:
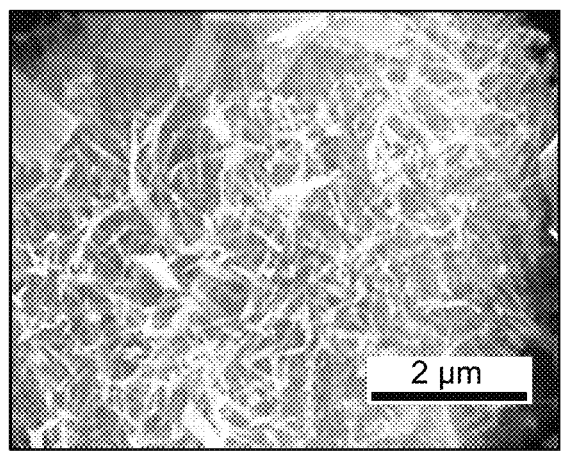
Figure 4A:
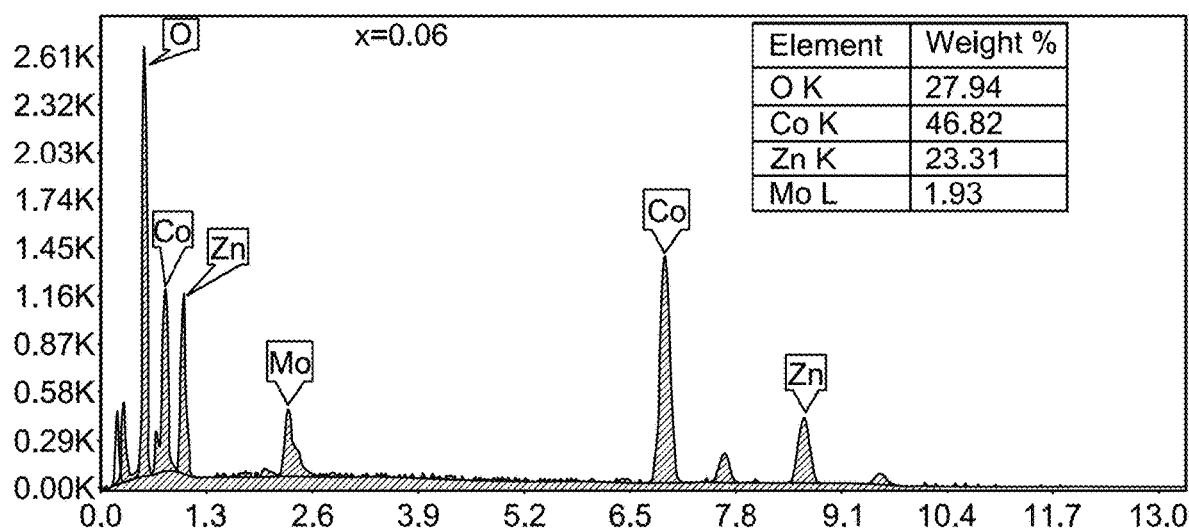
FIG. 4A shows energy-dispersive X-ray (EDX) spectra of $ZnCo_{2-x}Mo_xO_4$ (x=0.06), according to certain embodiments.
Figure 4B:
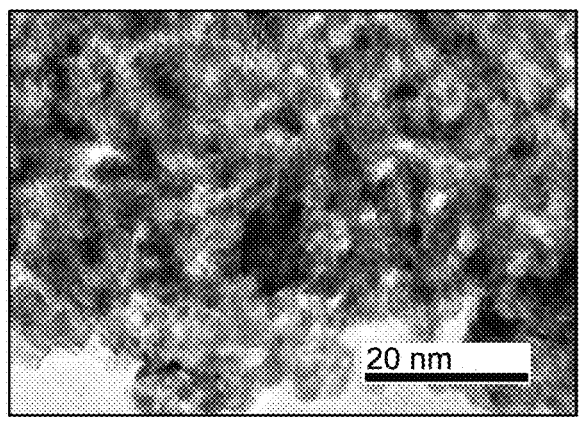
FIG. 4B shows transmission electron microscopy (TEM) of $ZnCo_{2-x}Mo_xO_4$ (x=0.06), according to certain embodiments.
Figure 4C:
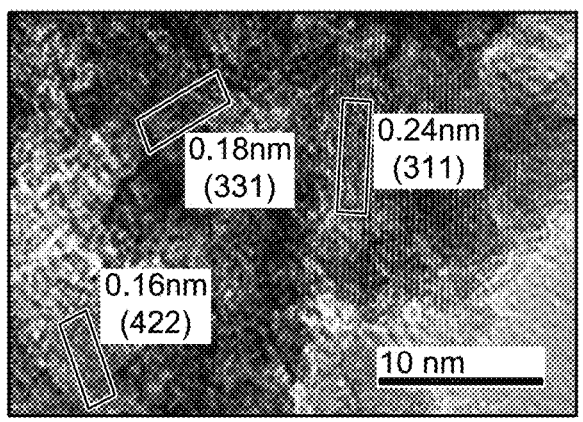
FIG. 4C is a high-resolution transmission electron microscopy (HR-TEM) image of $ZnCo_{2-x}Mo_xO_4$ (x=0.06), according to certain embodiments.

The surface morphology and elemental composition of ZnCo$_{2-x}$Mo$_x$O$_4$ (x=0.06) were analyzed with SEM and high-resolution transmission electron microscopy (HR-TEM), as illustrated in FIGS. 3A-3C and FIGS. 4A-4C. FIGS. 3A-3C show the different magnifications of SEM images, which illustrates the uniform growth of the 3D structure of highly agglomerated spherical particles with sizes around 2 micrometers (μm) to 5 μm. The spherical particles, including well-aligned nanoneedles, were observed in the high-magnification images. This type of morphology is used to penetrate the electrolyte to provide higher transportation for HER with a reduction of the energy necessitated to split the H—O bond. The EDX analysis of ZnCo$_{2-x}$Mo$_x$O$_4$ (x=0.06) was presented in FIG. 4A and the spectrum shows the existence of Zn, Mo, Co, and O elements. These results indicate that the EDX spectrum contains only relevant peaks related to the materials. No extra peaks were observed for contaminates, which confirms the purity of the prepared materials. Furthermore, FIG. 4B and FIG. 4C show the TEM and HR-TEM of $ZnCo_{2-x}Mo_xO_4$ (x=0.06) illustrating the formation of nanoneedles. Furthermore, the interplanar spacings and the lattice fringes distance at 0.16, 0.18, and 0.24 nm corresponding to (422), (331), and (311) shown by the HR-TEM image are calculated. The derived results are consistent with that of the XRD results observed in FIG. 2A-2B.

Example 7: XPS Analysis

Figure 5A:
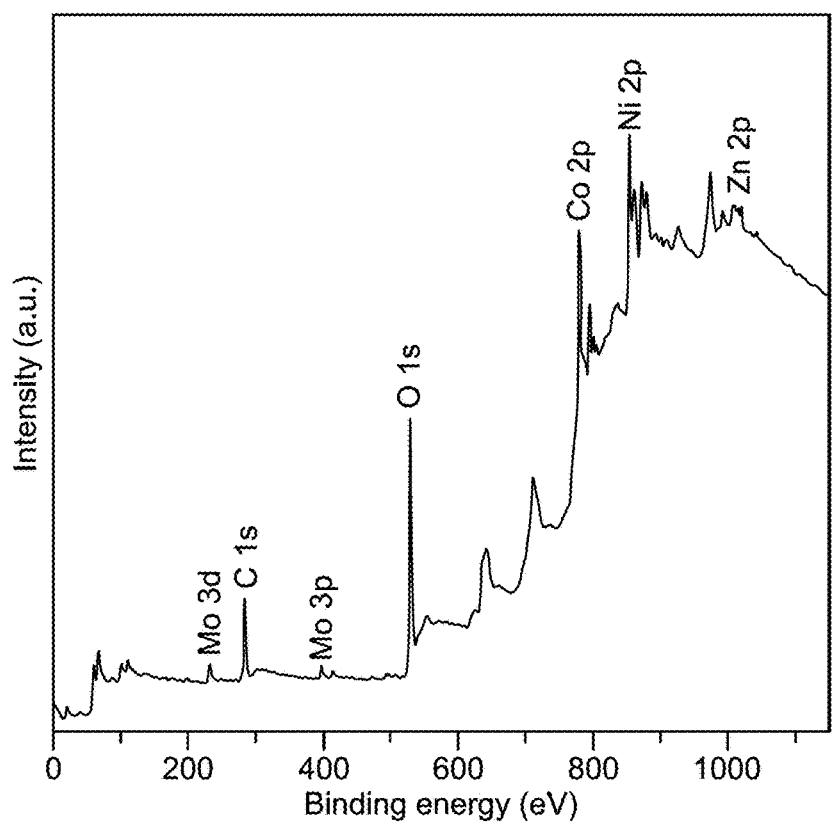
FIG. 5A shows X-ray photoelectron spectroscopy (XPS) analysis of $ZnCo_{2-x}Mo_xO_4$ (x=0.06), according to certain embodiments.
Figure 5B:
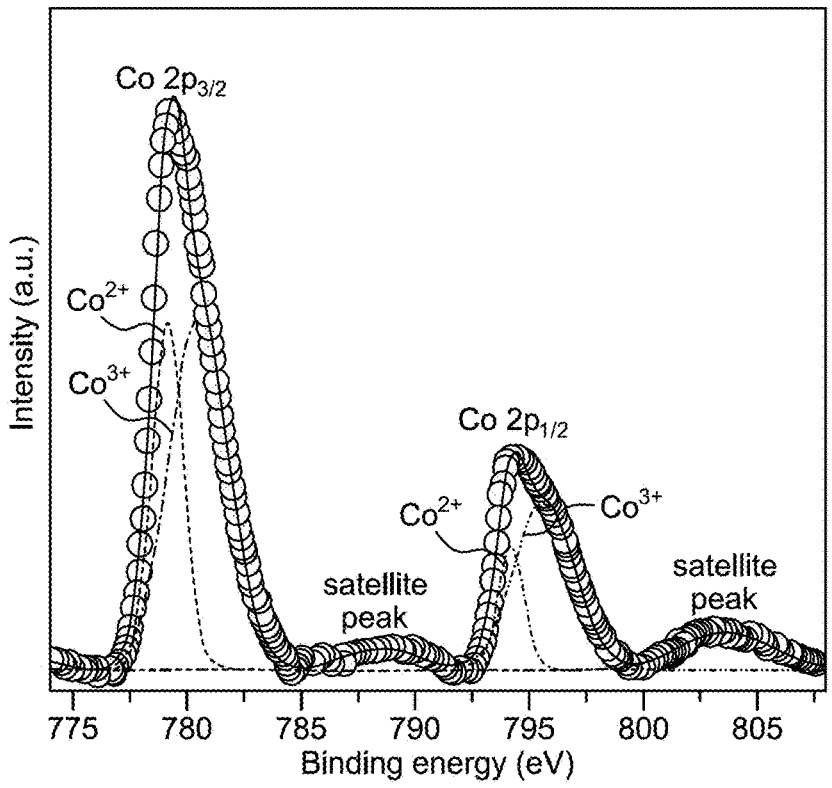
FIG. 5B shows Co 2p in an XPS analysis of $ZnCo_{2-x}Mo_xO_4$ (x=0.06), according to certain embodiments.
Figure 5C:
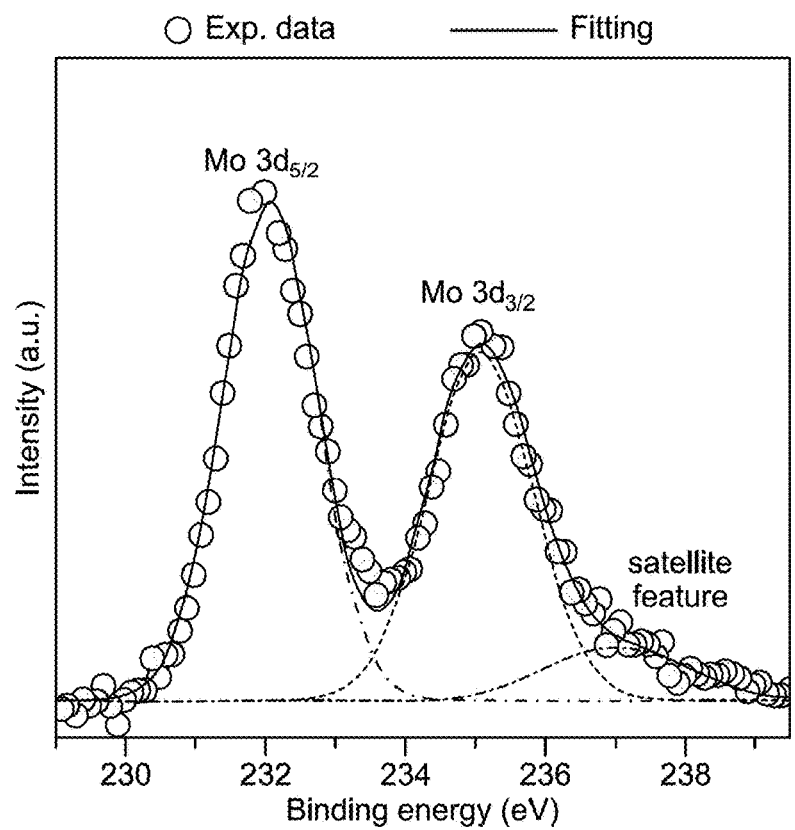
FIG. 5C shows Mo 3d in an XPS analysis of $ZnCo_{2-x}Mo_xO_4$ (x=0.06), according to certain embodiments.
Figure 5D:
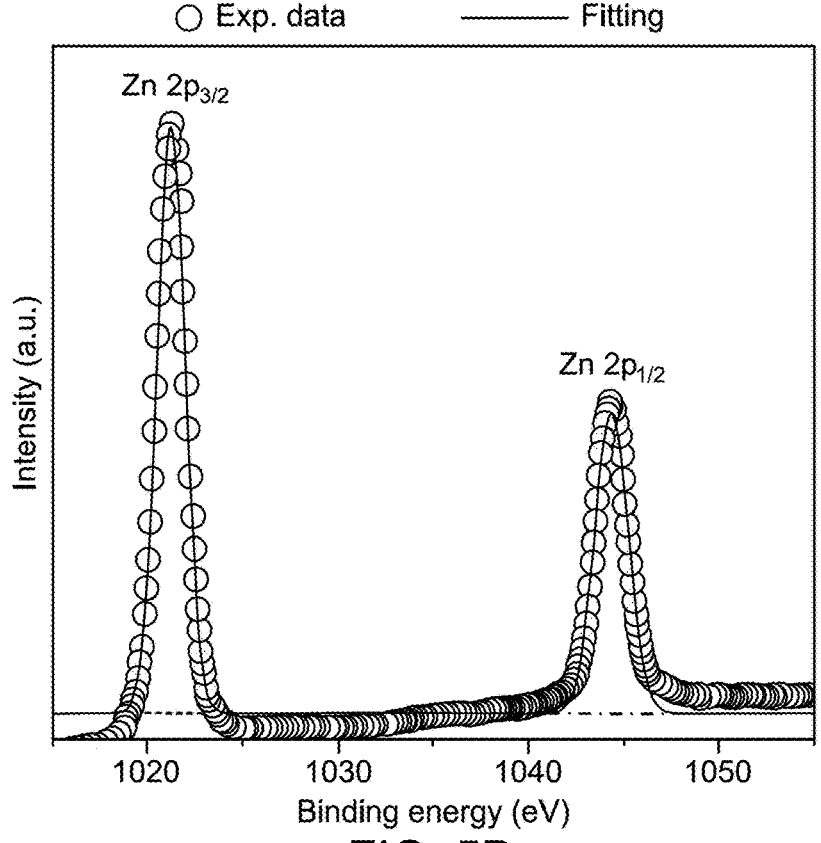
FIG. 5D shows Zn 2p in an XPS analysis of $ZnCo_{2-x}Mo_xO_4$ (x=0.06), according to certain embodiments.
Figure 5E:
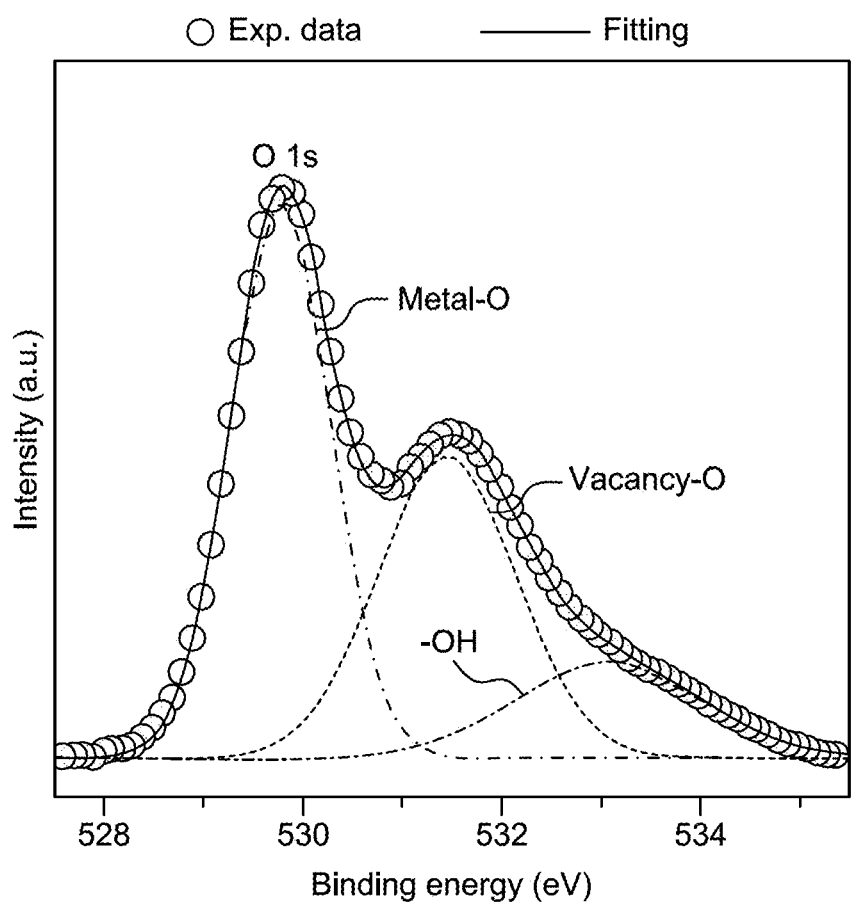
FIG. 5E shows O is in an XPS analysis of $ZnCo_{2-x}Mo_xO_4$ (x=0.06), according to certain embodiments.

X-ray photoelectron spectroscopy (XPS) was employed to examine the chemical bonding and oxidation state of each element in $ZnCo_{2-x}Mo_xO_4$ over a broad range of energy spectrums to verify the existence of Co, Zn, Mo, and O, as shown in FIG. 5A. To further confirm the chemical state, the high-resolution spectra of each element were acquired by rescanning in a narrow energy range. FIG. 5B shows the core spectra of Co 2p. It exhibits two major peaks at Co $2p_{3/2}$ and Co $2p_{1/2}$ at 779.3 electron volt (eV) and 794.4 eV, along with the satellite peaks at 788.8 eV and 803.6 eV. The deconvolution of Co 2p spectra presented two characteristic peaks. The peaks at 779.2 eV and 794.2 eV are attributed to the $Co^{2+}$ state, while peaks at 780.6 eV and 795.5 eV are attributed to the $Co^{3+}$ state. This indicates the presence of Co atoms at octal and tetrahedral sites in the spinel structure. FIG. 5C exhibits the core spectra of Mo 3d arising from the spin-orbit coupling of $3d_5/2$ and $3d_{3/2}$ states corresponding to the binding energy of 232.0 eV and 235.1 eV, respectively, along with a satellite peak at 237.0 eV. The core spectra of Zn $2p_{3/2}$ and Zn $2p_{1/2}$ were observed at 1020.3 eV and 1043.4 eV, as shown in FIG. 5D. The deconvolution did not introduce any new peak of other oxidation states of Zn and confirmed the presence of Zn in the $2^+$ oxidation state, partially occupying the tetrahedral sites in the spinel structure. The O 1s core level spectrum was observed and presented in FIG. 5E. The deconvolution provided three characteristic peaks at 529.8 eV, 531.3 eV, and 533.0 eV corresponding to the metal-oxygen bonding in cobaltite structure, oxygen defects in the spinel matrix, and surface hydroxyl groups, respectively. The defected oxygen in the spinel matrix may enhance the HER performance.

Example 8: Electrochemical Performance

Figure 6A:
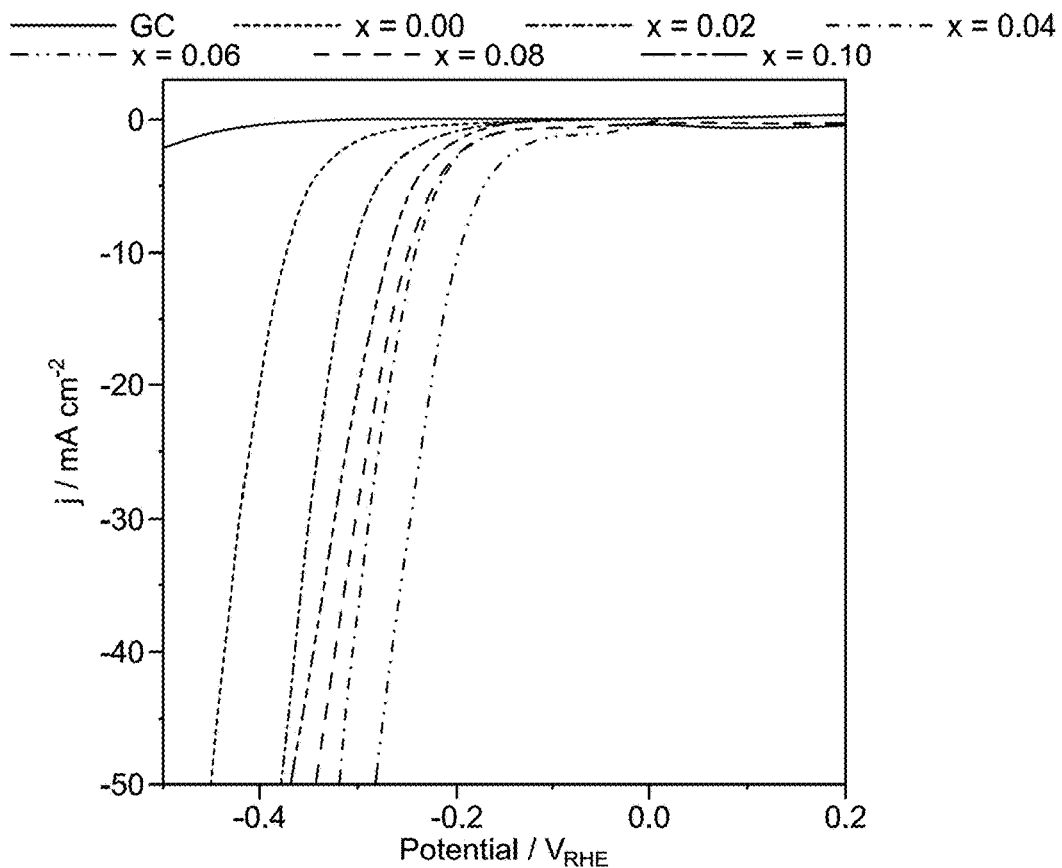
FIG. 6A is a graph of linear sweep voltammetry (LSV) polarization curves of $ZnCo_{2-x}Mo_xO_4$ (x≤0.10) electrocatalyst measured in 1.0 molar (M) potassium hydroxide (KOH), solution, according to certain embodiments.
Figure 6B:
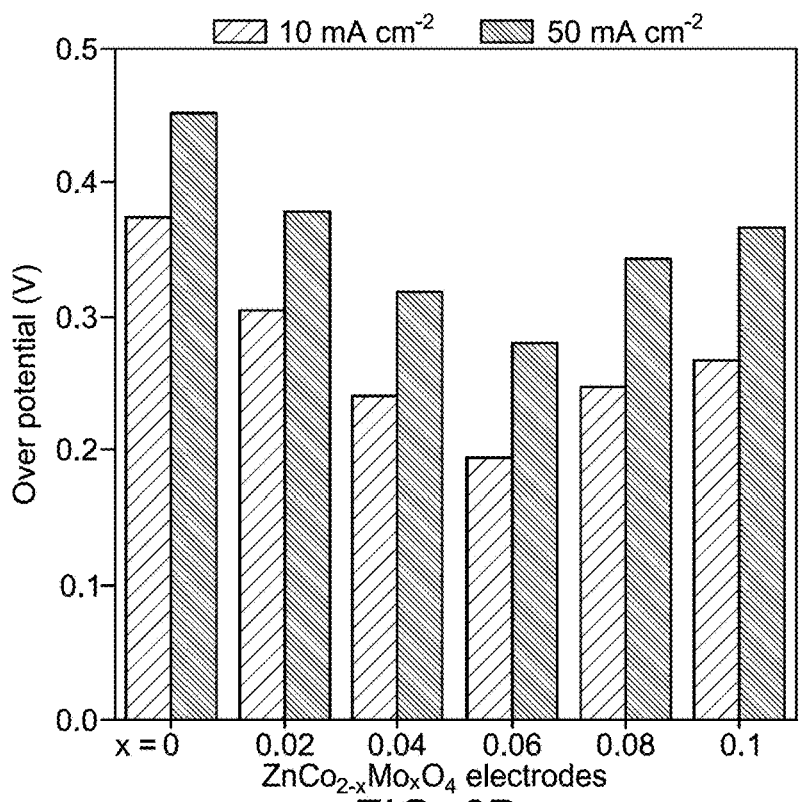
FIG. 6B is a overpotential (η) histogram at 10 milliamperes per square centimeter ($mA\ cm^{-2}$) and 50 $mA\ cm^{-2}$ of $ZnCo_{2-x}Mo_xO_4$ (x≤0.10) electrocatalyst measured in 1.0 M KOH solution, according to certain embodiments.
Figure 6C:
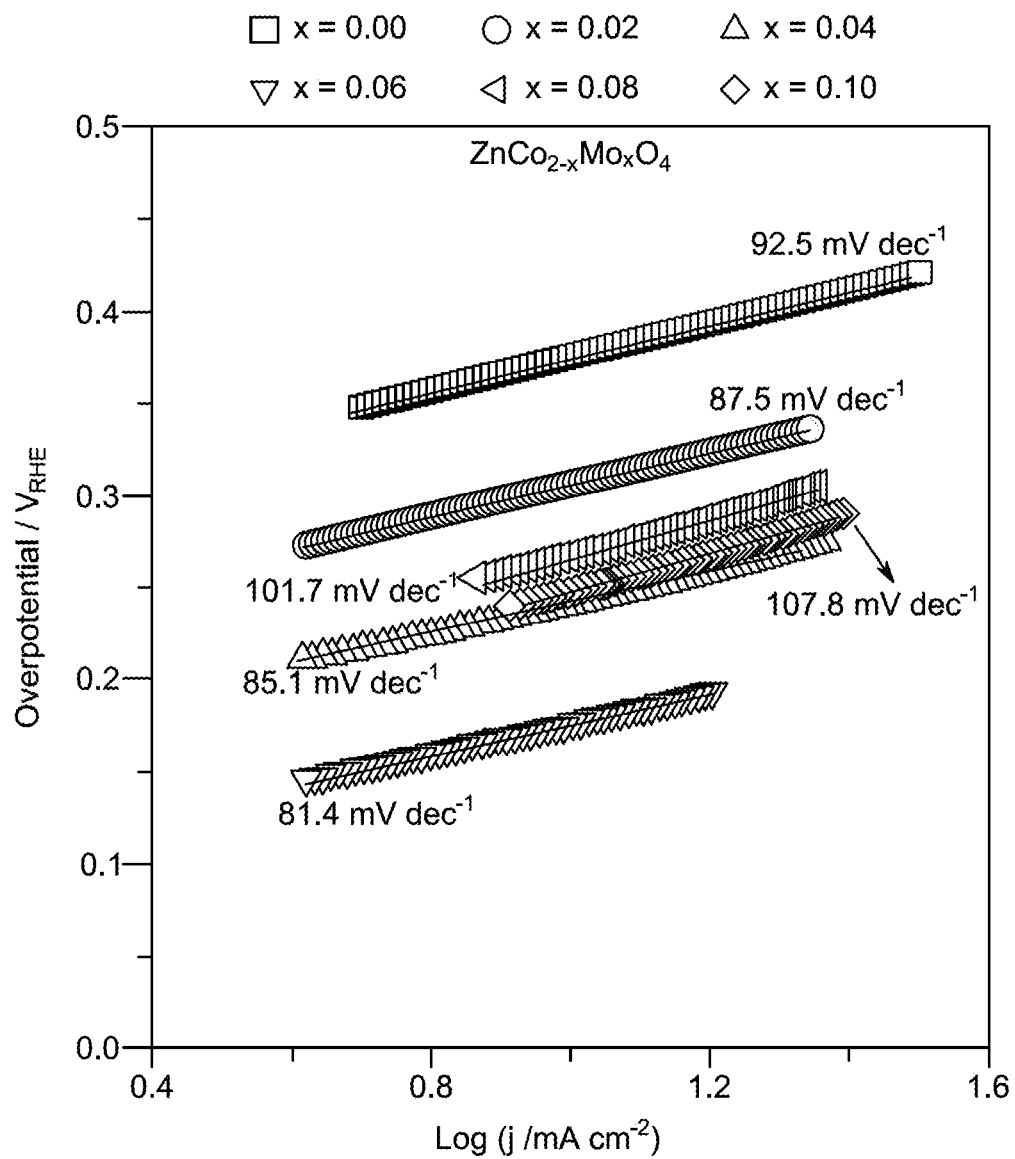
FIG. 6C shows a Tafel plot of $ZnCo_{2-x}Mo_xO_4$ (x≤0.10) electrocatalyst measured in 1.0 M KOH solution, according to certain embodiments.

The electrochemical performance of the representative bare and $ZnCo_{2-x}Mo_xO_4$ (x≤0.10) electrodes was evaluated by performing linear sweep voltammetry (LSV) and chronopotentiometry (CP) in three-electrode system in a $N_2$-saturated 1.0 M KOH solution (pH=13.6). FIG. 6A shows the LSV curves obtained at a 5 mV $s^{-1}$ scan rate. After the GC electrode was $ZnCo_2O_4$ modified, the current was enhanced to 10 mA cm-2 and an overpotential of −0.37 $V_{RHE}$ was reached. Further, the catalytic activity was enhanced after Mo doping to the Co sites in $ZnCo_2O_4$, forming $ZnCo_{2-x}Mo_xO_4$. Doping with high valence elements such as $Mo^{6+}$ into the metal alloyed oxides might adjust the electronic structure, thereby increasing the withdrawal of electrons for $Mo^{6+}$ to enhance the active sites for HER activity. Thus, incorporating $Mo^{6+}$ in the $ZnCo_2O_4$ matrix tunes the electronic structure of Co in the matrix, thereby improving the HER activity and efficiency by providing more catalytic centers. As shown in FIG. 6B, the synthesized $ZnCo_{2-x}Mo_xO_4$(x=0.06) electrode exhibits the best HER catalytic activity with low overpotential of 195 mV and 280 mV to achieve the current density of 10 mA $cm^{-2}$ and 50 mA cm-2 respectively, which is higher than other $ZnCo_{2-x}Mo_xO_4$ and bare $ZnCo_2O_4$ electrodes. Further, the hydrogen evolution kinetics of bare and Mo-doped $ZnCo_2O_4$ electrodes was explored by a linear fit of the Tafel plot in a Tafel slopes for the overpotential (f) versus the log of current density. FIG. 6C shows the Tafel slope of 6% Mo-doped $ZnCo_2O_4$ electrode had 81.4 millivolts per decade (mV $dec^{-1}$), which is smaller than other compositions of Mo-doped and bare $ZnCo_2O_4$ electrodes. This demonstrates that 6% Mo-doped $ZnCo_2O_4$ is more favorable and faster reaction kinetics than other compositions of Mo-doped and bare $ZnCo_2O_4$ electrodes. However, the Tafel slope was again increased for 8% and 10% Mo-doped $ZnCo_2O_4$ electrodes, for the suppressed active sites and consistent with the LSV curves in FIG. 6A.

Figure 7A:
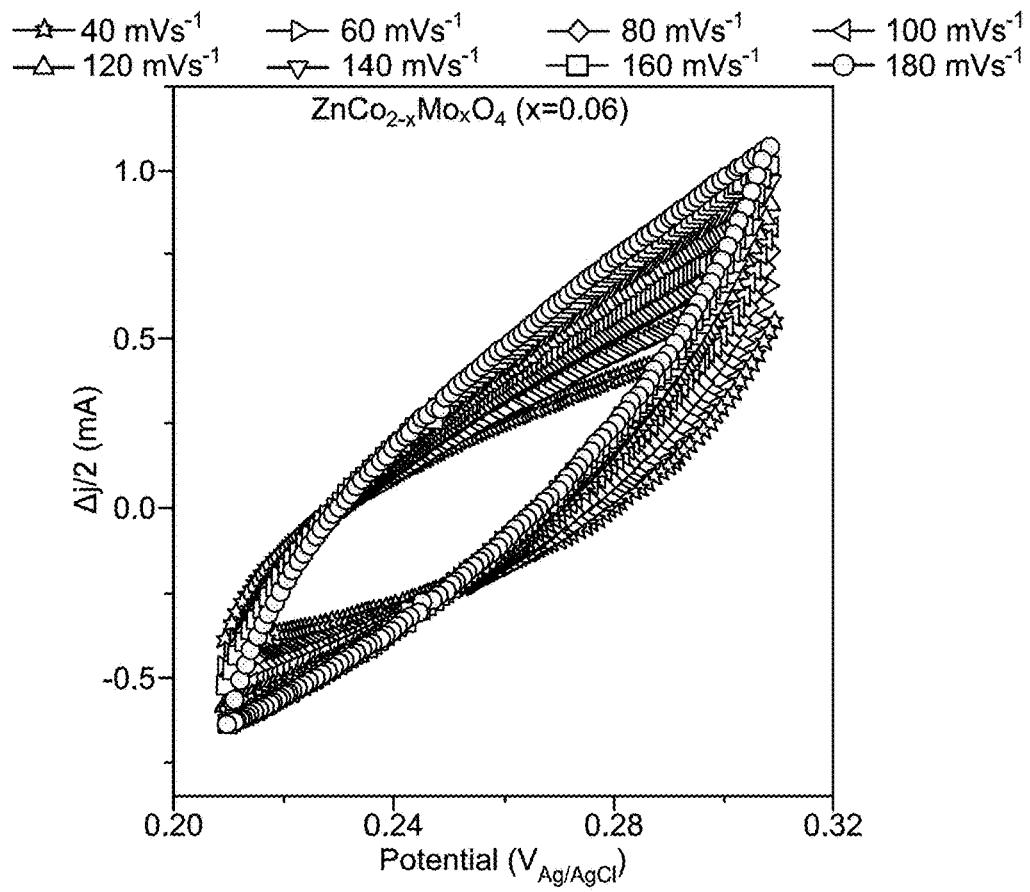
FIG. 7A is a cyclic voltammetry (CV) curve of $ZnCo_{2-x}Mo_xO_4$ (x=0.06) electrocatalyst, according to certain embodiments.
Figure 7B:
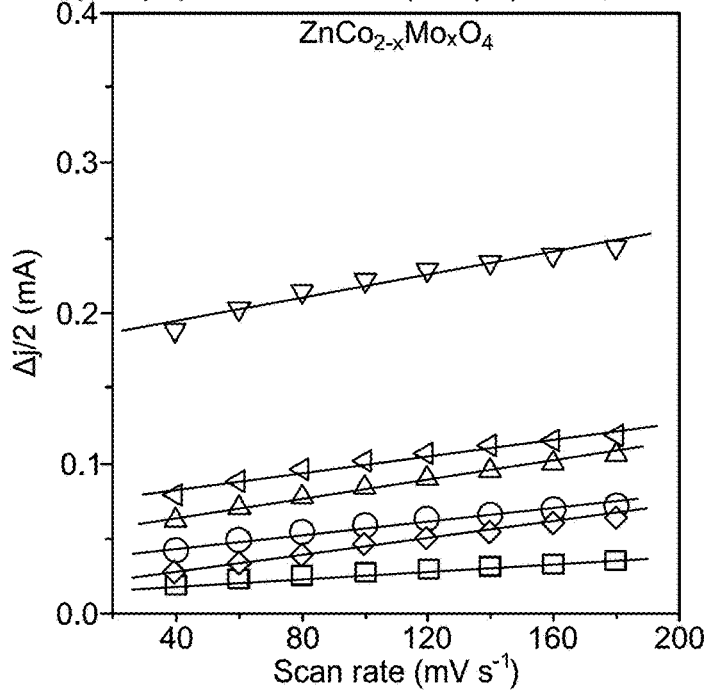
FIG. 7B shows double layer capacitance (Cdl) of $ZnCo_{2-x}Mo_xO_4$ (x=0.06) electrocatalyst, according to certain embodiments.
Figure 7C:
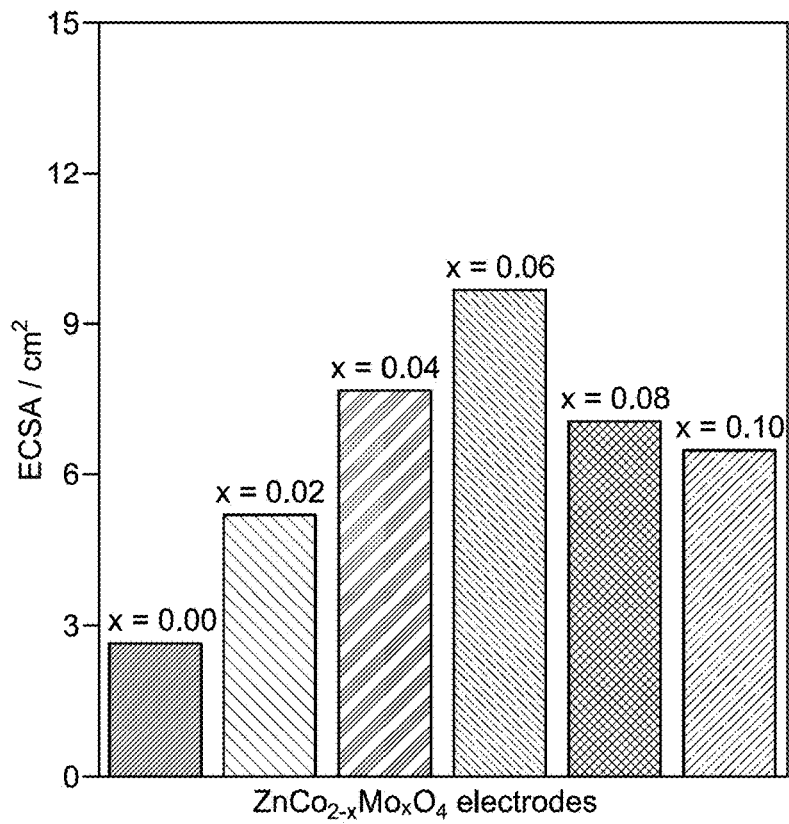
FIG. 7C is a histogram of electrochemical surface area (ECSA) of $ZnCo_{2-x}Mo_xO_4$ (x=0.06) electrocatalyst, according to certain embodiments.
Figure 7D:
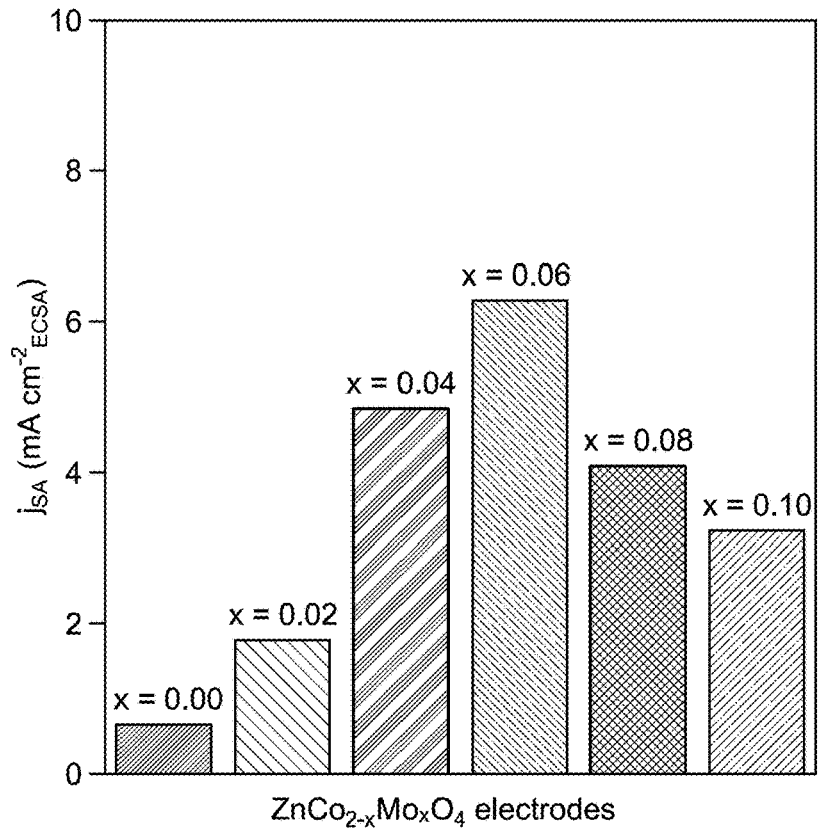
FIG. 7D is a histogram of specific current activity ($j_{SA}$) of $ZnCo_{2-x}Mo_xO_4$ (x≤0.10) electrocatalysts, according to certain embodiments.
Figure 8A:
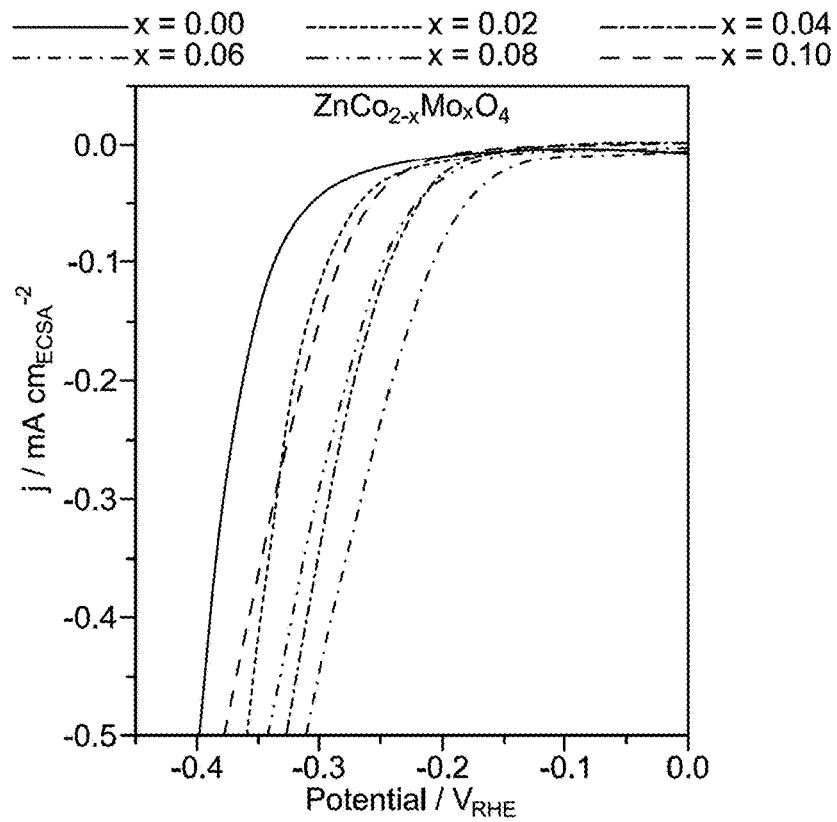
FIG. 8A shows LSV curves normalized against ECSA of the $ZnCo_{2-x}Mo_xO_4$ catalysts (x=0.0, 0.02, 0.04, 0.06, 0.08, and 0.1), according to certain embodiments.
Figure 8B:
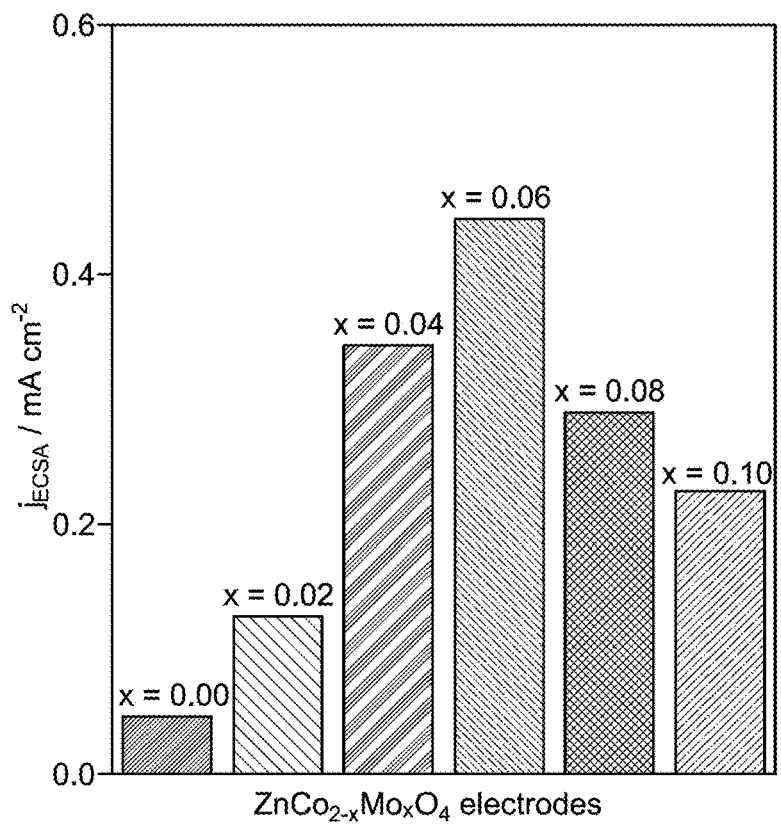
FIG. 8B is a histogram of normalized current against ECSA at 0.3 V overpotential of the $ZnCo_{2-x}Mo_xO_4$ electrodes (x=0.0, 0.02, 0.04, 0.06, 0.08, and 0.1), according to certain embodiments.
Figure 8C:
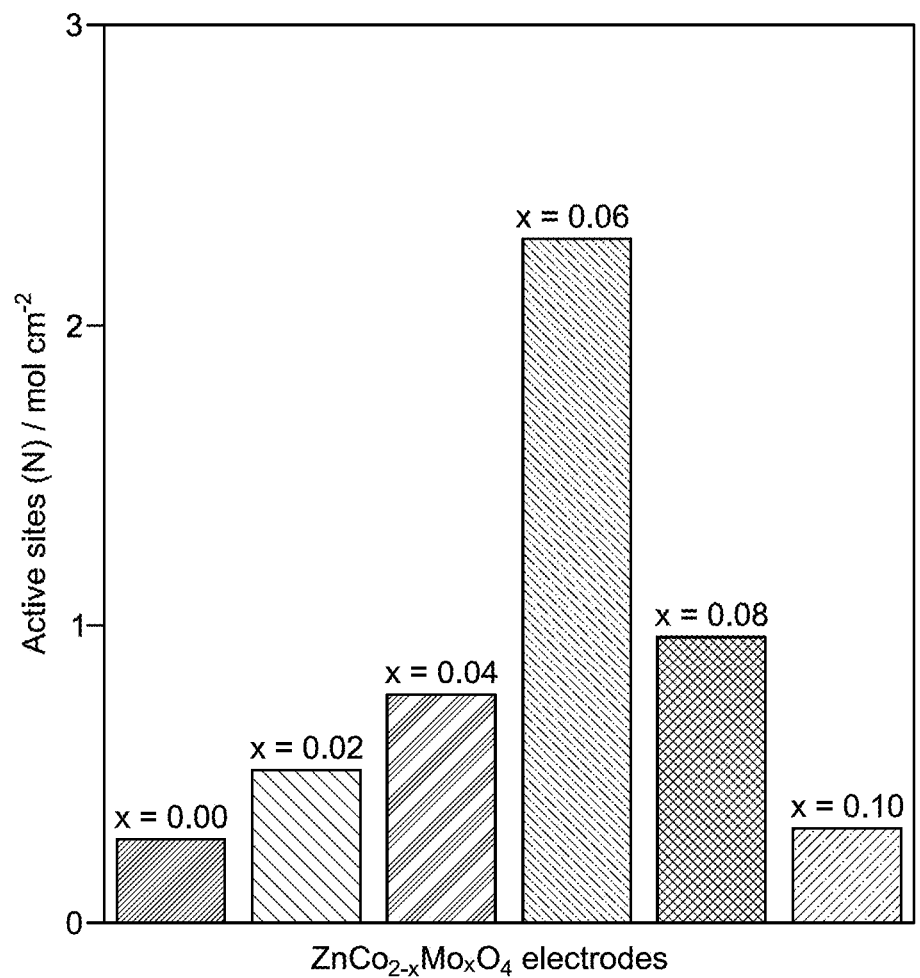
FIG. 8C is a histogram showing number of active sites (N) for $ZnCo_{2-x}Mo_xO_4$ (x≤0.10) electrodes measured in 1.0 M KOH solution, according to certain embodiments.

The electrochemical active surface area (ECSA) was further investigated to explore the intrinsic HER activity of bare and Mo-doped $ZnCo_2O_4$ electrodes. ECSA is calculated by measuring the double-layer capacitance ($C_{dl}$), which was assessed by measuring cyclic voltammetry at different scan rates within a non-faradic region, as shown in in FIG. 7A. The CVs are measured from 0.21-0.31 $V_{Ag}/A_gCl$ at different scan rates from 40 to 180 mV $s^{-1}$ in 1.0 M KOH solution. The $ZnCo_{2-x}Mo_xO_4$(x=0.06) electrode exhibits the largest $C_{dl}$ value of 0.386 mF $cm^{-2}$ among other $ZnCo_{2-x}Mo_xO_4$ and bare $ZnCo_2O_4$ electrodes, as shown in FIG. 7B. This $C_{dl}$ value of $ZnCo_{2-x}Mo_xO_4$ (x=0.06) electrode is four times higher than that of bare $ZnCo_2O_4$ electrode, which indicates the significance of Mo doping in the $ZnCo_2O_4$ matrix. Accordingly, the $ZnCo_{2-x}Mo_xO_4$ (x=0.06) electrode exhibits a significantly higher ECSA of 9.65 $cm^2$ as compared to that od bare $ZnCo_2O_4$ electrode of 2.63 $cm^2$ and other Mo-doped $ZnCo_2O_4$ electrodes as illustrated in the histogram of ECSA as shown in FIG. 7C. Further, doping of Mo prevents the surface oxidation of $ZnCo_2O_4$ and exposes more active sites to enhance the HER process. However, excessive doping of Mo in $ZnCo_2O_4$ may cause structure and composition changes which may lead to suppression of the active sites and may act as a recombination center. These findings are consistent with the LSV results in FIG. 6A. To further exclude the effect of surface area on catalytic performance, the LSV curves were normalized against ECSA, as shown in FIG. 8A and FIG. 8B. The $ZnCo_{2-x}Mo_xO_4$ (x=0.06) electrode still exhibits higher HER activity, which indicates that Mo doping significantly improves intrinsic properties, and enhances the catalytic HER activity. Further, the active sites (N) of the catalyst of represented electrodes were calculated from surface charge density ($Q_S$), and it was found that $ZnCo_{2-x}Mo_xO_4$(x=0.06) electrode of 0.22 coulomb per square centimeters (C cm $^{-2}$) exhibited higher surface charge density as compared to bare and other Mo-doped $ZnCo_2O_4$ electrodes. As shown in FIG. 8C, a higher number of active sites $2.28782 \times 10^{-6}$ mol $cm^{-2}$ compared to bare and Mo-doped $ZnCo_2O_4$ electrodes are noticed, thereby enhancing the HER process. This result is consistent with the LSV, Tafel plot, and ECSA of the representative electrodes. The specific activity (SA) was measured after ECSA and normalized to the current density at 0.3 V in 1.0 M KOH. As shown in FIG. 7D, the volcano plot was observed where $ZnCo_{2-x}Mo_xO_4$(x=0.06) electrode exhibited higher SA than bare and other Mo-doped $ZnCo_2O_4$ electrodes. This shows that the $ZnCo_{2-x}Mo_xO_4$(x=0.06) electrode possesses the largest active surface area and thus enhances the HER activity, which is consistent with the LSV, and Tafel slope.

Figure 9A:
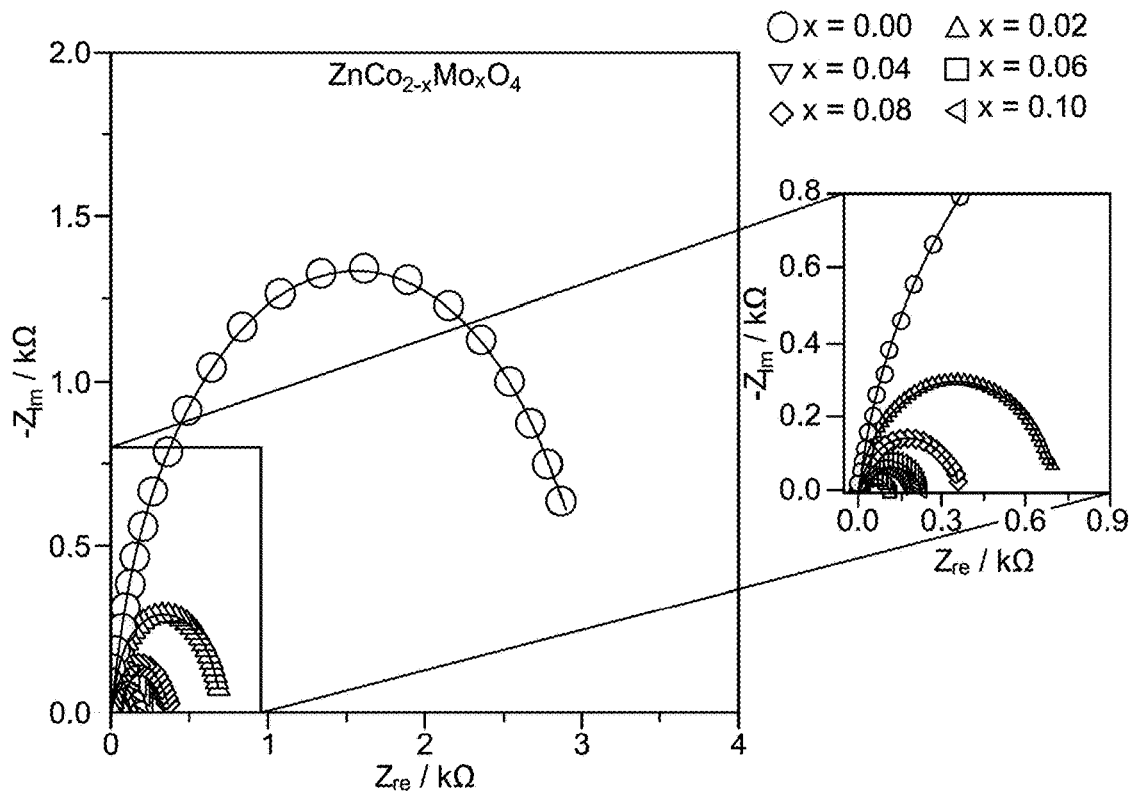
FIG. 9A shows electrochemical impedance spectroscopy (EIS) spectra of $ZnCo_{2-x}Mo_xO_4$ electrocatalysts, according to certain embodiments.
Figure 9B:
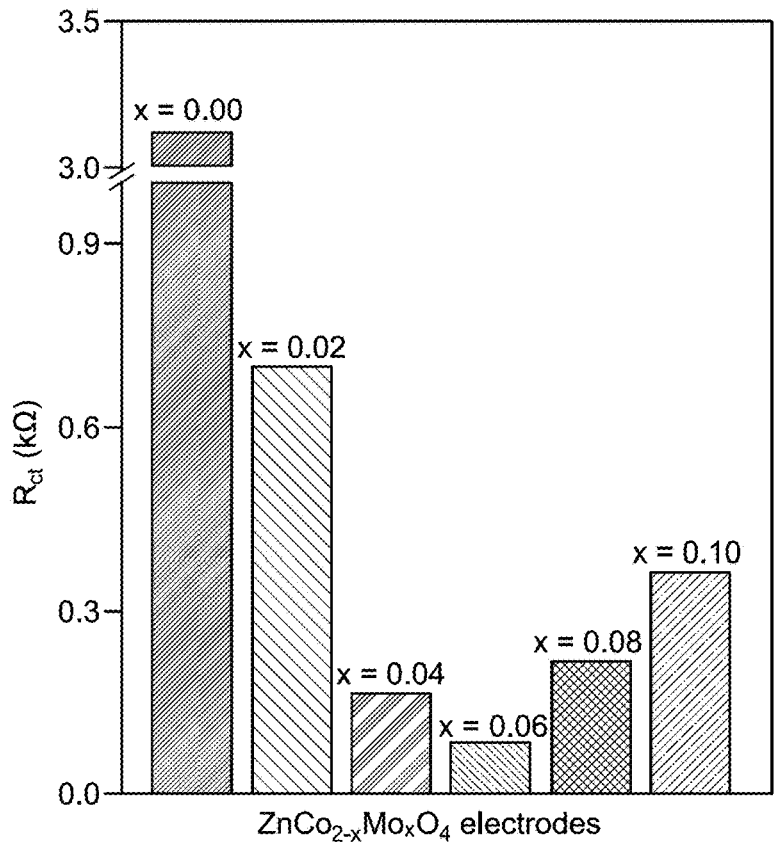
FIG. 9B is a charge transfer resistance ($R_ct$) histogram of the $ZnCo_{2-x}Mo_xO_4$ electrodes (x=0.0, 0.02, 0.04, 0.06, 0.08, and 0.1), according to certain embodiments.
Figure 9C:
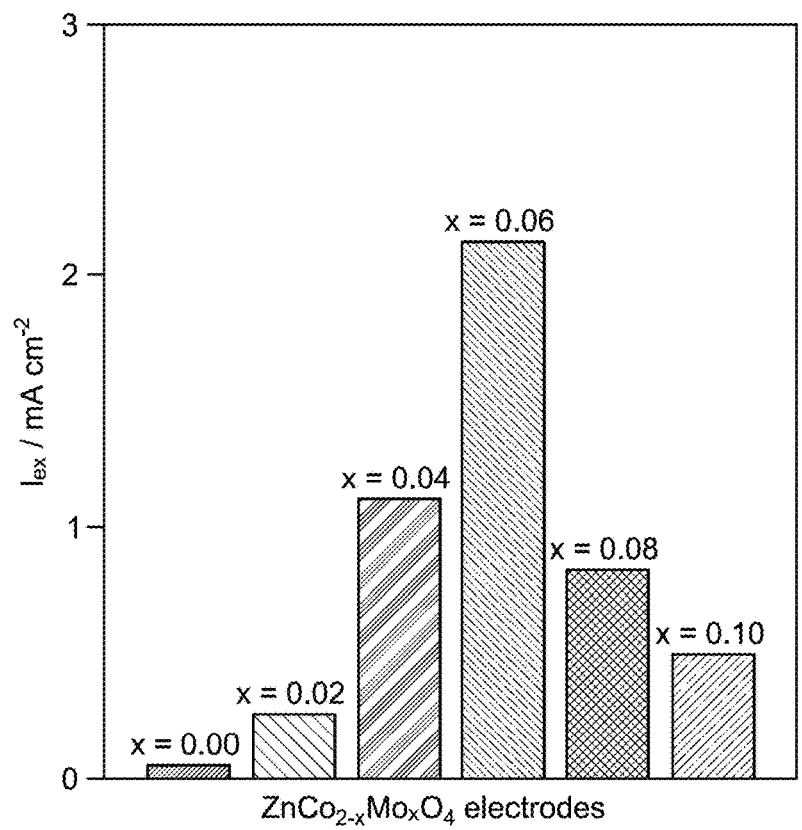
FIG. 9C is an exchange current density ($I_{ex}$) histogram of the $ZnCo_{2-x}Mo_xO_4$ electrodes (x=0.0, 0.02, 0.04, 0.06, 0.08, and 0.1), according to certain embodiments.
Figure 9D:
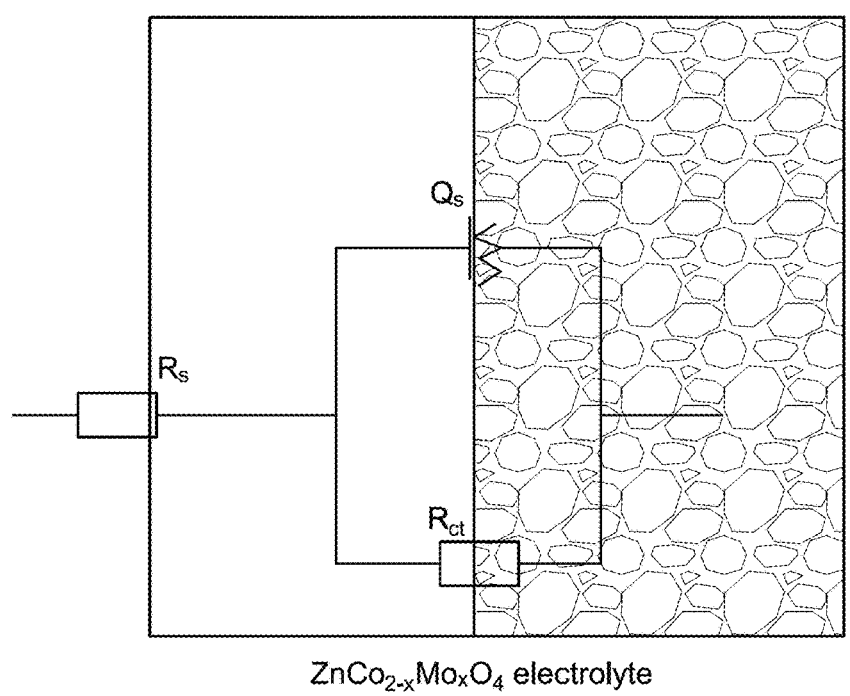
FIG. 9D is an illustration of an equivalent circuit used to fit the Nyquist plot of $ZnCo_{2-x}Mo_xO_4$ (x≤0.10) electrocatalyst, according to certain embodiments.

The electrical impedance spectroscopy (EIS) measurements were also performed to confirm the higher catalytic activity of $ZnCo_{2-x}Mo_xO_4$ (x=0.06) electrode than those of bare and other Mo-doped $ZnCo_2O_4$ electrodes. The Nyquist plot of bare, and Mo-doped $ZnCo_2O_4$ electrodes was measured at $-0.3$ $V_{RHE}$ potential to evaluate the charge transfer kinetics at the semiconductor electrolyte interface (SEI). FIG. 9A shows the typical semicircles for bare, and Mo-doped $ZnCo_2O_4$ electrodes that were observed and fitted with the equivalent circuits. $R_s$ shows the solution and connection resistance, while $R_{ct}$ and $C_s$ represent the SEI charge transfer resistance and capacitance. Table 2 exhibits the fitted parameters of the representative electrodes at $-0.3$ $V_{RHE}$ potential in an alkaline solution. FIG. 9B shows the histogram of $R_{ct}$ values of the representative electrodes, where bare $ZnCo_2O_4$ showing higher $R_{ct}$ of 3120 ohms (Ω), indicating that that of the bare electrodes. The Mo-doped $ZnCo_2O_4$ electrodes exhibit lower charge transfer resistance than the bare $ZnCo_2O_4$ electrode. As shown in FIG. 9B and table 2, the $ZnCo_{2-x}Mo_xO_4$ (x=0.06) electrode illustrates the lowest $R_{ct}$ of 85Ω than other Mo-doped $ZnCo_2O_4$ electrodes, which indicates that a faster charge transfer rate was observed at SEI, thus enhancing the HER process. Furthermore, the exchange current density ($I_{ex}$) was calculated to estimate the reflection of the intrinsic activity of the catalysts and the effect of $R_{ct}$ during HER. As shown in FIG. 9C the $I_{ex}$ value of $ZnCo_{2-x}Mo_xO_4$ (x=0.06) of 2.13 mA cm$^{-2}$ was higher than that of other Mo-doped compositions of $ZnCo_2O_4$ electrodes and bare $ZnCo_2O_4$ electrode. This indicates that the $ZnCo_2O_4$ electrodes exhibit lower resistance across the SEI, and a rapid electron transfer process was observed during the electrocatalytic process. The lower $R_{ct}$ and higher $I_{ex}$ values of $ZnCo_{2-x}Mo_xO_4$ (x=0.06) are consistent with the LSV and ECSA. An equivalent circuit used to fit the Nyquist plot of $ZnCo_{2-x}Mo_xO_4$ (x≤0.10) electrocatalyst is depicted in FIG. 9D.

TABLE 2

Comparison of fitted parameters from Nyquist plot for bare and $ZnCo_{2-x}Mo_xO_4$ (x ≤ 0.10) electrodes used for electrochemical HER performance.

| x | $R_s$ Ω | $R_{ct}$ Ω | $Q_s$ $1 \times 10^{-5}$ F | N | $\chi^2$ |
|---|---|---|---|---|---|
| 0.00 | 7.7 | 3119.6 | 5.5 | 0.902 | 0.015 |
| 0.02 | 6.8 | 699.1 | 12.1 | 0.888 | 0.078 |
| 0.04 | 7.1 | 162.1 | 21.3 | 0.854 | 0.071 |
| 0.06 | 8.1 | 85.3 | 20.6 | 0.852 | 0.108 |
| 0.08 | 5.4 | 216.2 | 15.4 | 0.866 | 0.086 |
| 0.10 | 6.2 | 360.8 | 18.3 | 0.846 | 0.038 |

Figure 10A:
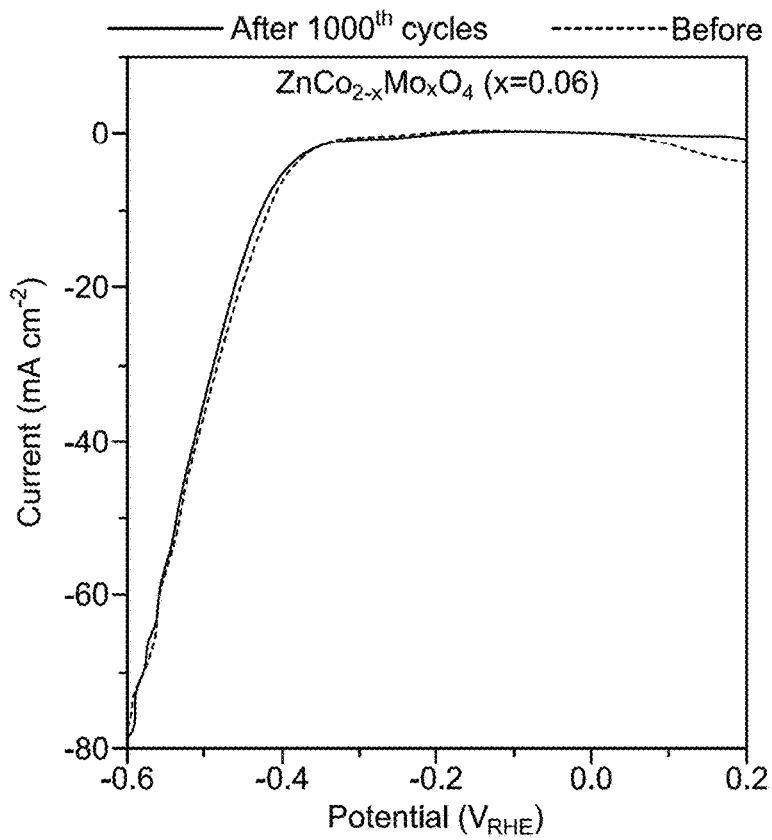
FIG. 10A is a graph of overlaid initial and final LSV showing the curves after $1000^{th}$ consecutive LSV scans for $ZnCo_{2-x}Mo_xO_4$ (x=0.06) electrocatalyst, according to certain embodiments.
Figure 10B:
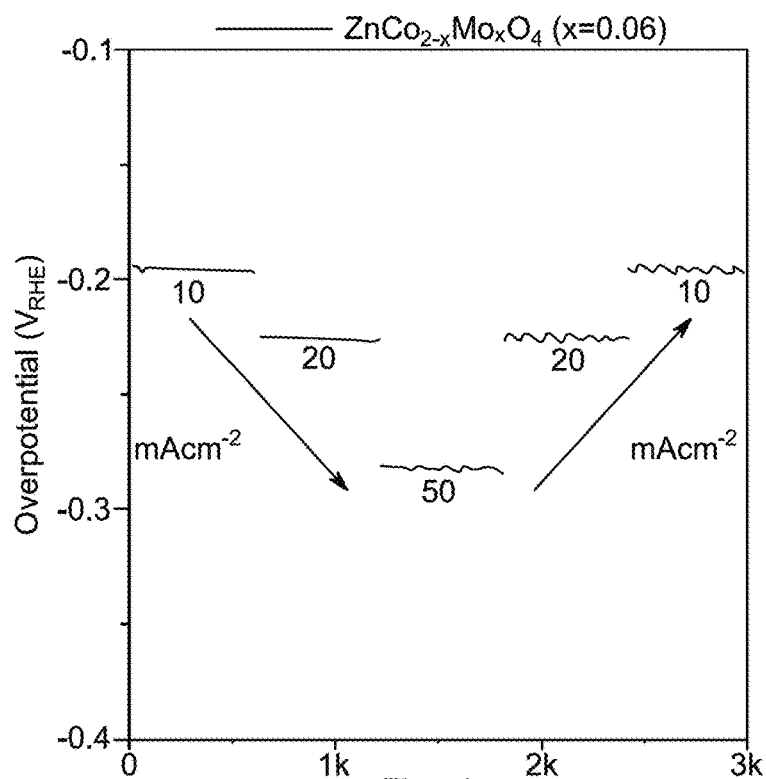
FIG. 10B is a graph of multi-step chronopotentiometry showing the curve within the current density range 10-50 mA cm$^{-2}$ for ZnCo$_{2-x}$Mo$_x$O$_4$ (x=0.06) electrocatalyst, according to certain embodiments.
Figure 10C:
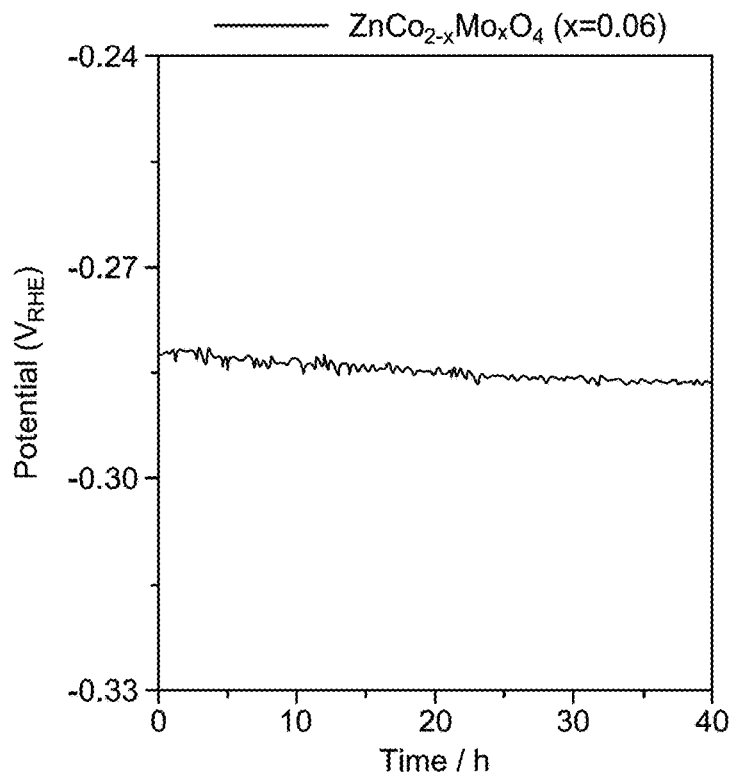
FIG. 10C is graph of potential-time dependent showing the curve at 50 mA cm$^{-2}$ current density for ZnCo$_{2-x}$Mo$_x$O$_4$ (x=0.06) electrocatalyst, according to certain embodiments.
Figure 10D:
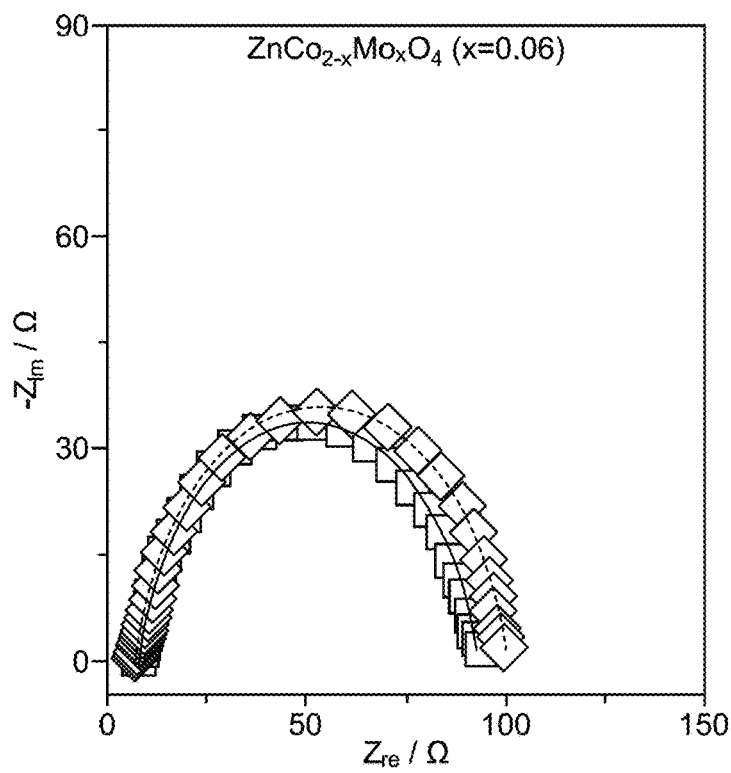
FIG. 10D shows a comparison of the Nyquist plot at −0.3 VRHE for the ZnCo$_{2-x}$Mo$_x$O$_4$ (x=0.06) electrocatalyst before and after the stability test in a 1.0 M KOH solution, according to certain embodiments.

In addition to the catalytic activity, durability, and long-term stability, especially at high current density, chronopotentiometry (CP) is essential for an advanced electrocatalyst. $ZnCo_{2-x}Mo_xO_4$ (x=0.06) electrocatalyst shows good operational stability on catalytic performance. An accelerated degradation test was used to confirm the stability of the 6% Mo-doped $ZnCo_2O_4$ electrocatalyst by measuring continuous 1000 LSV cycles. The 1$^{st}$ and the 1000$^{th}$ cycle LSV of $ZnCo_{2-x}Mo_xO_4$ (x=0.06) electrode show the same LSV measurement, except for a 10 mV difference, which might be attributed to the bubble formation on the surface of the electrode and u enhance the overpotentials as shown in FIG. 10A. The 10 mV change in the potential is due to the robust stability of the material. Furthermore, a CP test was performed on $ZnCo_{2-x}Mo_xO_4$ (x=0.06) electrocatalyst at applied potentials from 10, 20, and 50 mA cm$^{-2}$ for brief time intervals as shown in FIG. 10B, and the curve was consistent with the LSV curve. The instant response and constant potential of each step was attributed to a favorable mass transportation ability and strong robustness of $ZnCo_{2-x}Mo_xO_4$ (x=0.06) electrocatalyst. For practical applications, the long-term stability of the electrode is important in evaluating the electrode. FIG. 10C shows the long-term CP measurement of the $ZnCo_{2-x}Mo_xO_4$ (x=0.06) electrode performed at the constant current density of 50 mA cm$^{-2}$. After a 40 hours of continuous CP experiment, the potential was suppressed by 11 mV, and the suppressed factor was only 3%. During CP measurements, any range fluctuation which is due to continuous bubble formation and removal at the surface of the electrocatalyst surface was recorded. However, the $ZnCo_{2-x}Mo_xO_4$ (x=0.06) electrocatalyst exhibits excellent catalytic activity by retention of the potential for 40 hours as shown in FIG. 10C. FIG. 10D shows the Nyquist plot measured for $ZnCo_{2-x}Mo_xO_4$ (x=0.06) electrocatalyst at $-0.3$ $V_{RHE}$ after the stability test. The semicircle diameter observed in FIG. 10D shows that a small fluctuation was observed after the stability test. Further, The $R_{ct}$ value for $ZnCo_{2-x}Mo_xO_4$(x=0.06) electrocatalyst after the stability test reached 96Ω, which is just 11Ω higher than the value observed before the stability test of 85Ω. This shows that $ZnCo_{2-x}Mo_xO_4$(x=0.06) electrocatalyst exhibits no change in charge transfer resistance at the electrode-electrolyte interface during the HER process, making $ZnCo_{2-x}Mo_xO_4$ (x=0.06) electrocatalyst a superior electrocatalyst for HER. Moreover, the Tafel slope is used to validate the HER mechanism and reaction-rates determining stages. The Volmer, Heyrovsky, and Tafel processes are the most common routes for converting atomic H into H molecules. A combination of the Volmer process with Tafel or Heyrovsky may lead to the creation of molecular hydrogen. The rate-determining stage is followed by the Volmer mechanism when the slope value is around 120 mVdec$^{-1}$. The rate-determining stage is deemed to be followed by either the Heyrovsky or Tafel mechanism when the slope value is around 40 or 30 mVdec$^{-1}$, respectively. The present findings of the Tafel slope (81.4 mVdec$^{-1}$) for $ZnCo_{2-x}Mo_xO_4$ (x=0.06) electrocatalysts clearly indicated that the rate-determining stage was due to the Volmer-Heyrovsky mechanism.

Figure 11A:
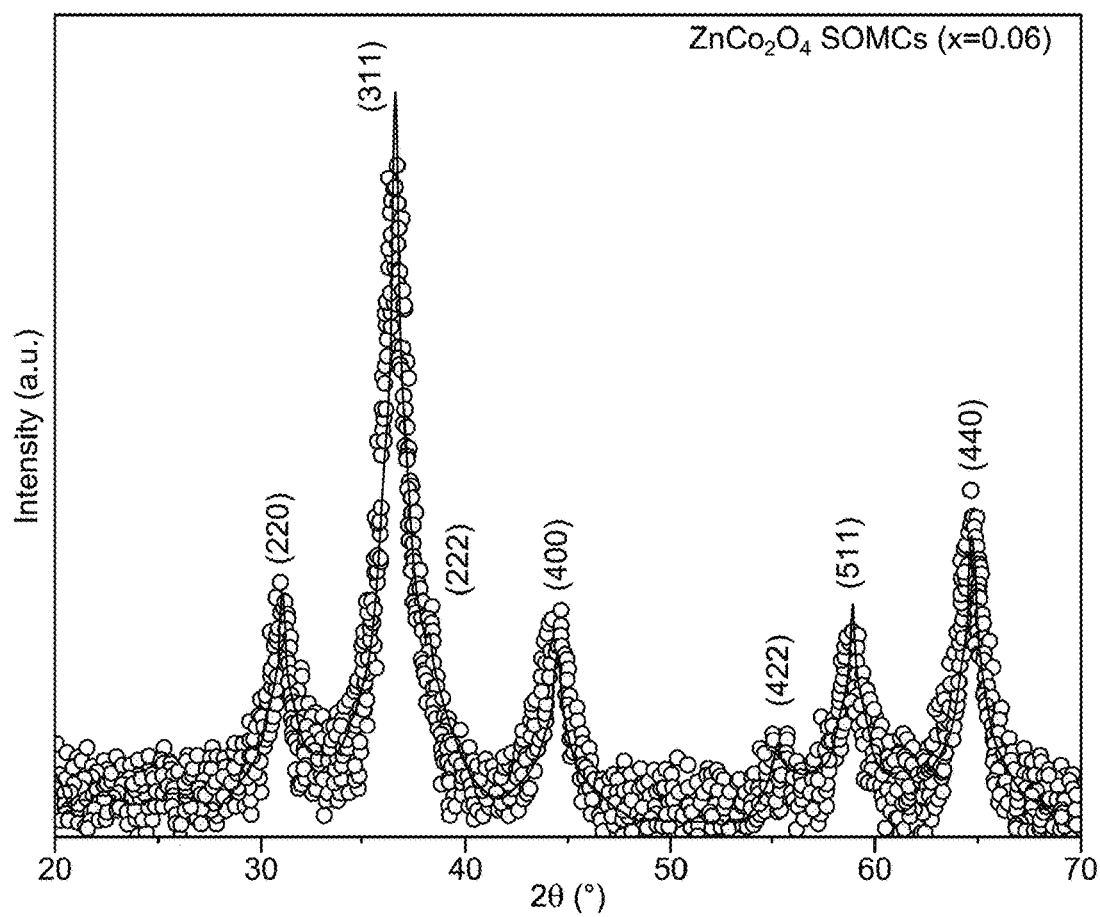
FIG. 11A shows XRD spectra for ZnCo$_{2-x}$Mo$_x$O$_4$ (x=0.06) electrocatalyst after the stability test, according to certain embodiments.
Figure 11B:
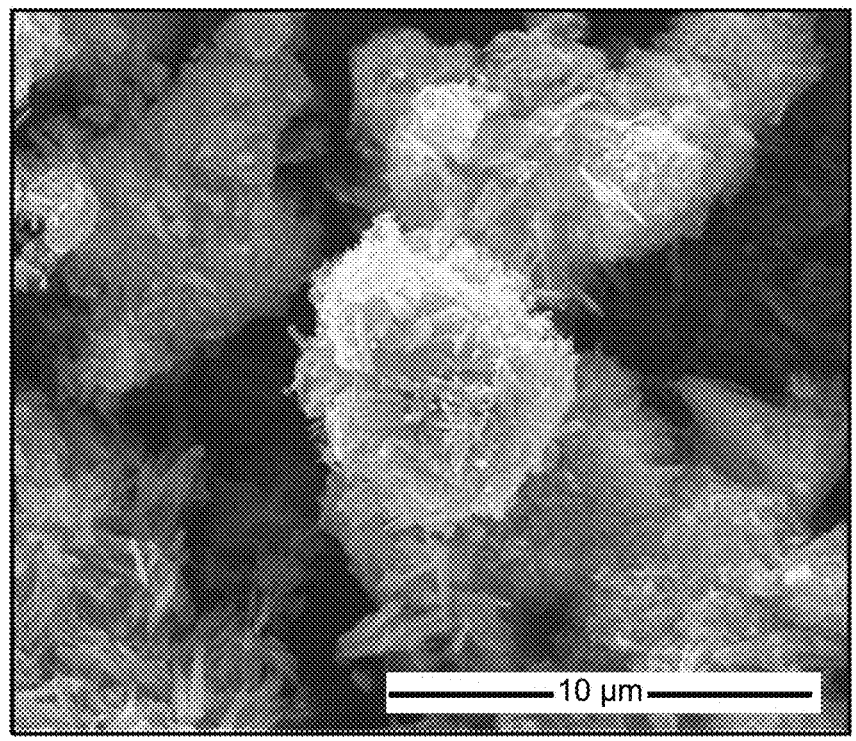
FIG. 11B is a FE-SEM image of the ZnCo$_{2-x}$Mo$_x$O$_4$ (x=0.06) electrocatalyst after the stability test, according to certain embodiments.

The post-HER stability of the $ZnCo_{2-x}Mo_xO_4$ (x=0.06) electrode was examined by measuring XRD as shown in FIG. 11A, and the results are consistent with the XRD results observed in FIGS. 2A and 2B. No change in the structure and composition was observed after long-term stability test. Moreover, the morphology of $ZnCo_{2-x}Mo_xO_4$ (x=0.06) after a stability test exhibited a microsphere with broken nanoneedles, as shown in FIG. 11B, which indicates that $ZnCo_{2-x}Mo_xO_4$ (x=0.06) electrocatalyst is a stable electrocatalyst and may be suitable for hydrogen fuel cell applications and industries.

Example 9: Density Functional Theory Calculations

By Using first-principles calculations within the density functional theory (DFT), numerical calculations were implemented to explain the influence of Mo dopants on the catalytic and HER activity. The structures are designed were examined using DFT-based QuantumATK software. The relevant characteristics were revealed by (i) hydrogen (H) and (ii) water (W) molecules adsorbed on the surface of both pristine surface organometallic chemistry (PSOMCs) and Mo-doped $ZnCo_2O_4$ surface organometallic chemistry (MSOMCs). The following atomic configurations were employed: H and W adsorbed on the surface of (i) PSOMCs (PSOMCs-H and PSOMCs-W, respectively), (ii) MSOMCs with 1.8% Mo content (MSOMCs-H$^I$ and MSOMCs-W$^I$, respectively), (iii) MSOMCs with 3.6% Mo concentration (MSOMCs-H$^{II}$ and MSOMCs-W$^{II}$, respectively). The structure of PSOMCs was designed to employ a unit cell composed of 56 atoms (8 Zn, 16 Co and 32 O atoms), with the below lattice parameters.

$A=11.409$ Å

$B=5.705$ Å

$C=20.067$ Å

Figure 12A:
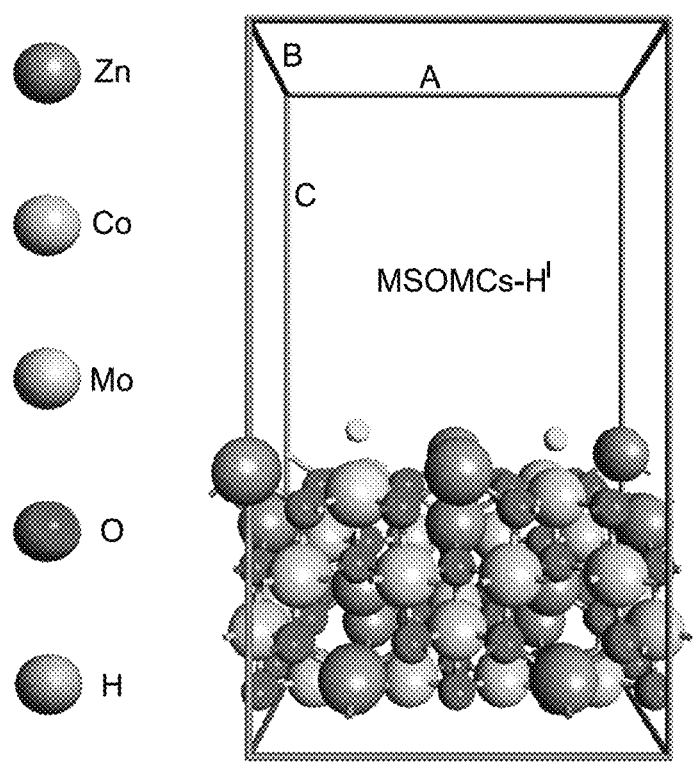
FIG. 12A is an illustration of unit cells for MSOMCs-H$^I$, according to certain embodiments.

A periodic-slab structure was utilized for the infinite PSOMCs (100) surface, which is perpendicular to z-axis (C), leading to non-periodicity in the direction of C due to the vacuum layer (with a thickness around of 15 Å) added right above the surface. Two representative unit cells, showing H and W molecules on the surface (MSOMCs-H$^I$ and MSOMCs-W$^I$), are depicted in FIG. 12A & FIG. 12. To optimize the individual atomic distances within the accompanying unit cells, representing doped structures, the force tolerance was set to 0.01 eV/Å. For the exchange and correlation potential, spin-resolved generalized gradient approximation (SGGA) with Perdew-Burke-Ernzerhof (PBE) functional (SGGA.PBE) was adopted. The SGGA was applied as it may adequately describe the distribution of ions in the associated nanoparticles. The atomic cores were represented by PseudoDojo pseudopotentials. The identification of the electronic structure of valence electrons (Zn: $4s^23d^{10}$, Co: $4s^23d^7$, Mo: $5s^14d^5$, O: $2s^22p^4$) was fulfilled by the medium basis sets of local numerical orbitals. A k-point sampling of (3,5,1) was chosen with a mesh cutoff energy of 125 Hartree.

The chemical reactivity and HER activity on the catalyst surfaces involves (i) water adsorption and dissociation, and (ii) H adsorption and desorption. Substitutional dopants may improve the reactivity and HER activity The catalytic activity was investigated through the water molecules, which were adsorbed on the surface of the catalysts. The relevant adsorption energy ($E_A$) of water molecules was computed using the below-mentioned equation $$E_A = E_{system} - E_{slab} - E_W$$

where $E_{system}$ is the total energy of the nanoparticles, $E_{slab}$ stands for the energy without water, and $E_W$ denotes the energy of water molecules. The adsorption energy implies the interaction between the surface and molecules right above it. A positive adsorption energy refers to unstable adsorption. On the other hand, a negative $E_A$ indicates an exothermic process and allows the molecules to adsorb on the slab surface. The more negative $E_A$ is, the more favorable ihe molecule adsorption. During the process of molecule adsorption, the strength of the adsorption energy determines the types of adsorption mechanisms. A lower negative $E_A$ indicates a physisorption while a higher negative $E_A$ indicates chemisorption. These mechanisms are related to the altered bond lengths and charge transfer. The water adsorption energies are respectively calculated to be −2.32 eV (−53.61 kcal/mol), −2.40 eV (−55.23 kcal/mol), and −2.47 eV (−57.03 kcal/mol) for the PSOMCs-W, MSOMCs-W$^I$, and MSOMCs-W$^{II}$. As the most negative $E_A$ was exhibited by MSOMCs-W$^{II}$, MSOMCs-W$^{II}$ may have the highest stability and reactivity in water adsorption. The Mo dopants substituting for the Co ions in MSOMCs-W$^{II}$ are responsible for the highest catalytic activity. The corresponding dissociation of water molecules is related to the strength of the interaction with the surface atoms in a slab. Due to the reactivity and adsorption energy of Mo-doped $ZnCo_2O_4$ nanostructures, Mo-doped $ZnCo_2O_4$ may be used as catalysts.

TABLE 3

$E_A^H$ and $\Delta G^H$ values for the PSOMCs-H, MSOMCs-H$^I$ and MSOMCs-H$^{II}$.

| System | $E_A^H$ (eV) | $\Delta G^H$ (eV) |
|---|---|---|
| PSOMCs-H | −2.73 | −0.38 |
| MSOMCs-H$^I$ | −2.72 | −0.37 |
| MSOMCs-H$^{II}$ | −2.70 | −0.35 |

Figure 12B:
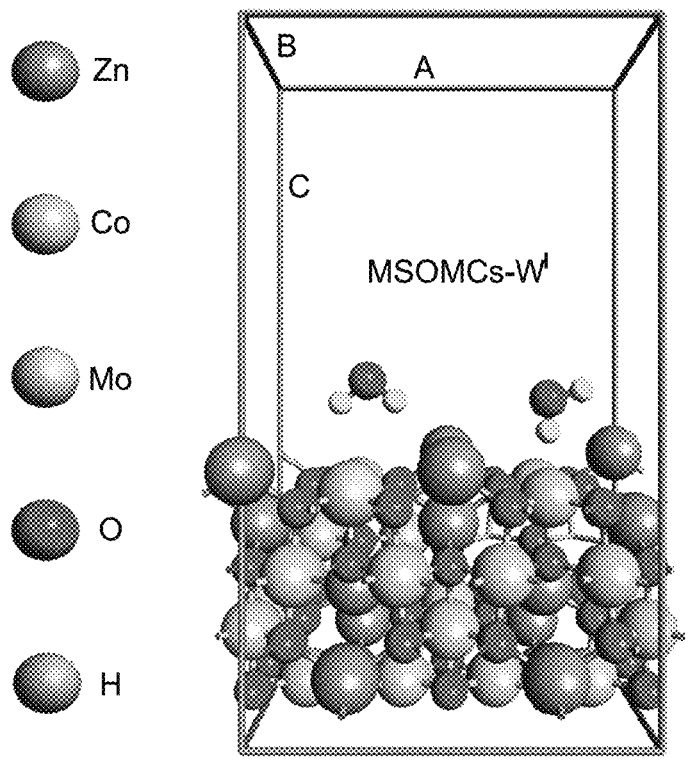
FIG. 12B is an illustration of unit cells for MSOMCs-W$^I$, according to certain embodiments.

FIG. 12A and FIG. 12B show the HER activity examined through the H atoms adsorbed on the surface. $\Delta G^H$ plays a significant role in exposing the HER activity of catalysts. Gibb's free energy of H adsorption ($\Delta G^H$) was determined. $\Delta G^H$ is proportional to hydrogen adsorption energy ($E_A^H$), which may be computed with the help of total energy, zero-point energy and entropy term. The equation is as below.

$$\Delta G^H = \Delta E^H + 0.24 \text{ eV}$$

where $\Delta E^H$ stands for the hydrogen chemisorption energy. Both the values of $E_A^H$ and $\Delta G^H$ are listed in Table 3. The $E_A^H$ ($\Delta G_H$) energies were calculated to be 2.73 eV (−0.38 eV), −2.72 eV (−0.37 eV), and −2.70 eV (−0.35 eV) for the PSOMCs-H, MSOMCs-H$^I$, and MSOMCs-H$^{II}$, respectively. The $\Delta G^H$ values obtained in the present work agreed with earlier results on iron oxide-based nanocomposites and various metals including Mo. Possessing a suitable $\Delta G^H$ is vital for the HER process. Efficient HER activity is exhibited by negative $\Delta G^H$ values closer to zero. A positive $\Delta G^H$ implies diminishing of H adsorption on the catalyst. In contrast, a negative $\Delta G^H$ shows the enhancement of H molecules on the surface. As a result, of all the structures, MSOMCs-H$^{II}$ may be the most efficient catalyst for HER activity. This result confirms the improvement of chemical activity with Mo dopants as the highest catalytic activity due to water also exhibited by the same Mo-doped slab (MSOMCs-W$^{II}$). This is due to the accompanying interaction and charge transfer due to hybridization of orbitals. It was already reported that Mo dopants could improve the HER performance of $ZnIn_2S_4$ structures and CoP nanoarrays. Comparing the $E_A^H$ and $\Delta G_H$ values demonstrates that a higher H adsorption energy yield may minimize the HER activity. Thus, the efficiency of the catalysts is also related to the strength of the H adsorption energy.

Figure 13A:
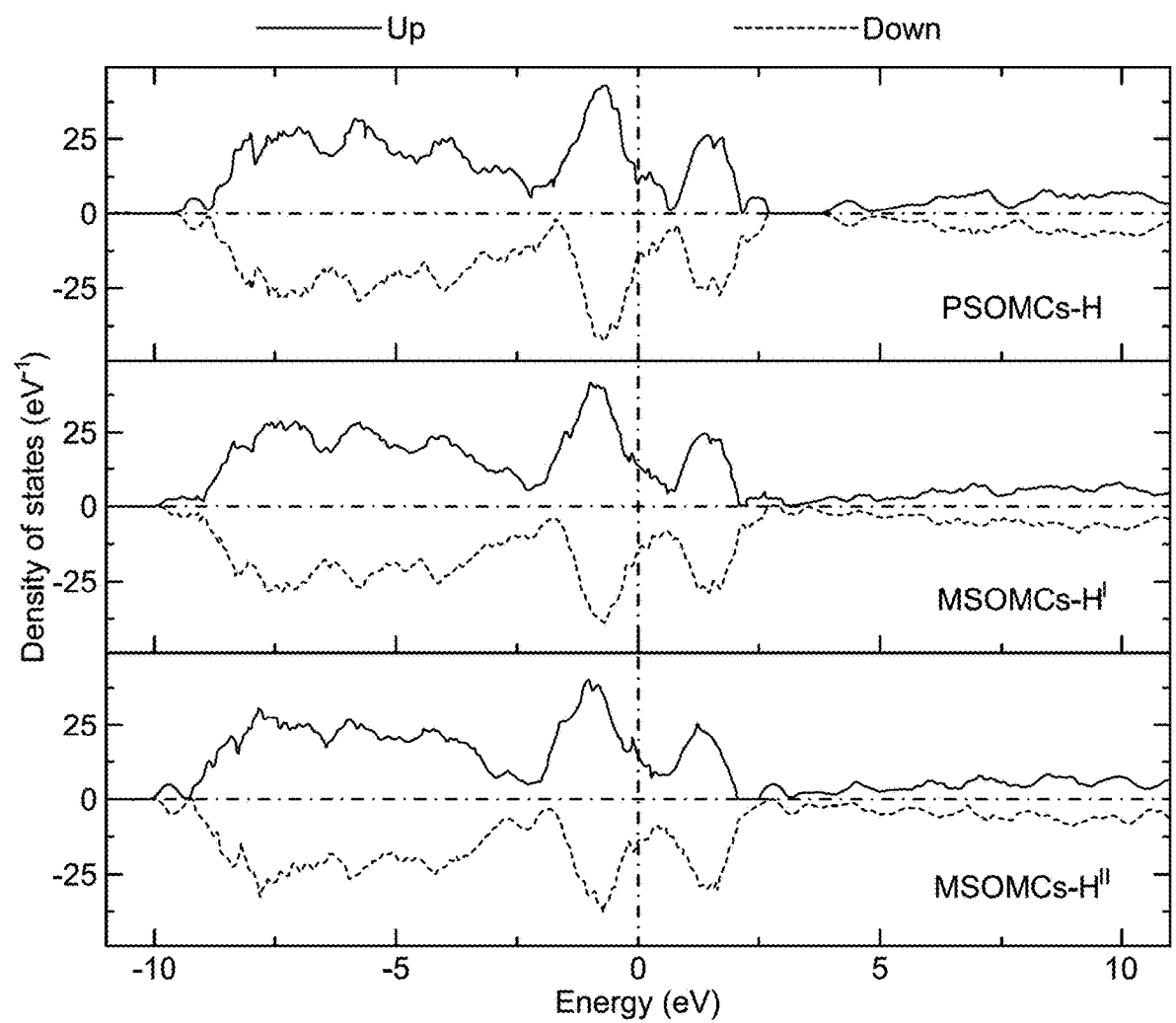
FIG. 13A is a graph of density of states (DOS$_{\uparrow\downarrow}$) for the PSOMCs-H, projected to the Mo dopants within MSOMCs-H$^I$ and MSOMCs-H$^{II}$, according to certain embodiments.
Figure 13B:
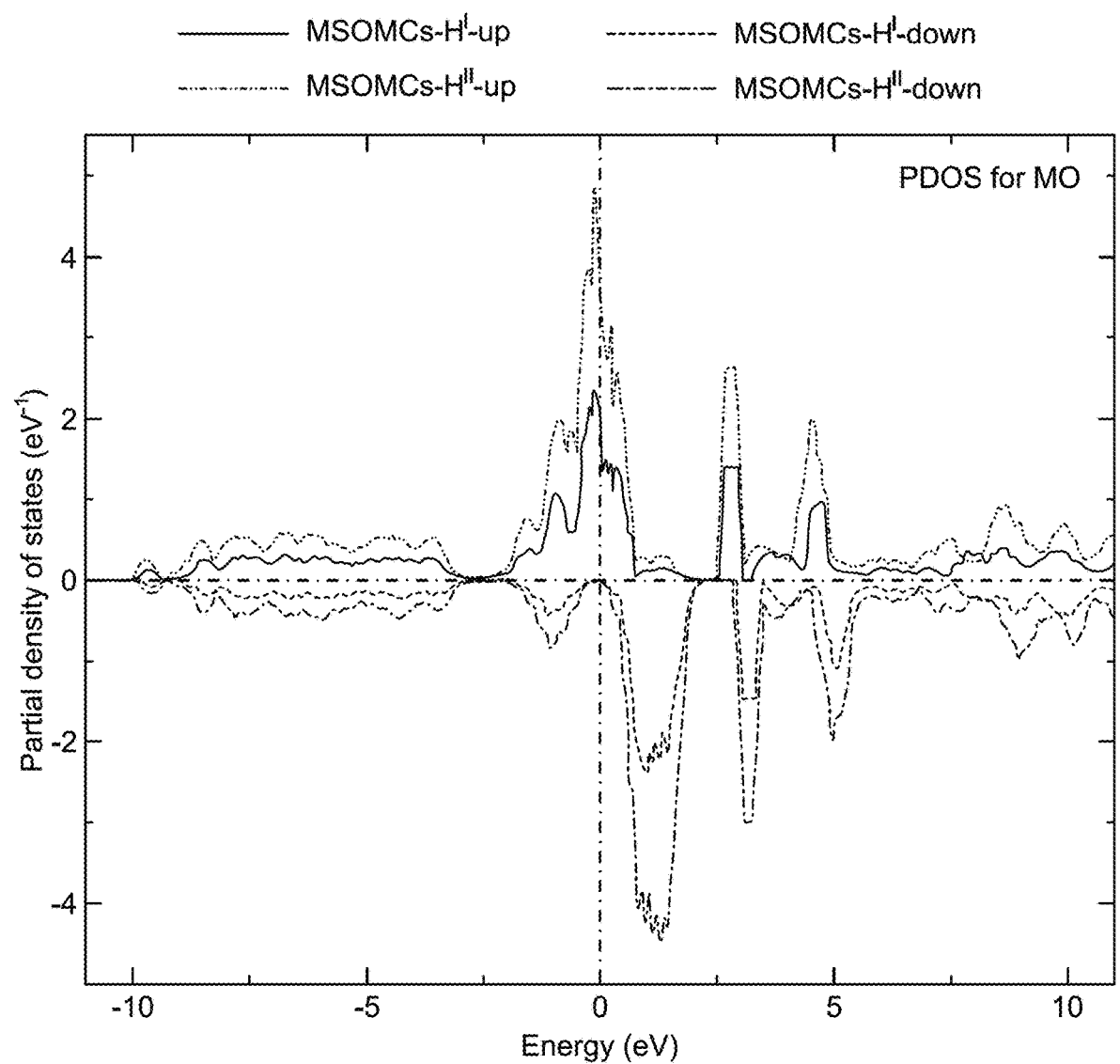
FIG. 13B is a graph of partial density of states (PDOS$_{\uparrow\downarrow}$) for the MSOMCs-H$^I$ and MSOMCs-H$^{II}$, projected to the Mo dopants within MSOMCs-H$^I$ and MSOMCs-H$^{II}$, according to certain embodiments.
Figure 13C:
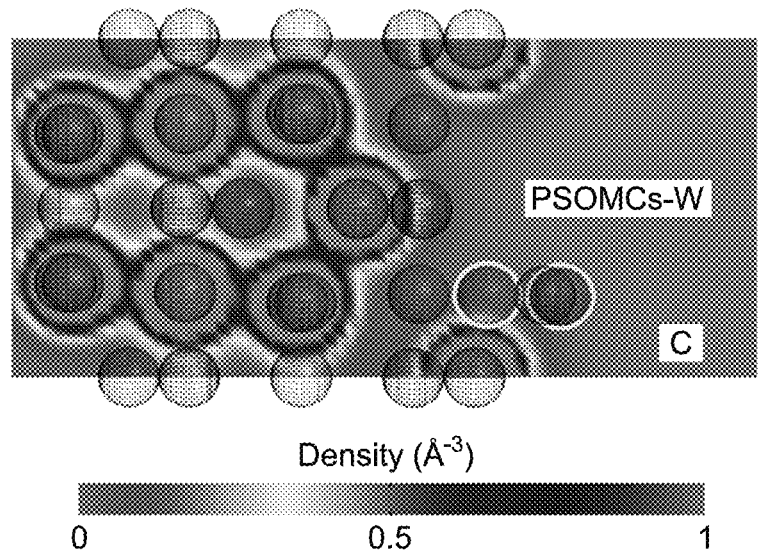
FIG. 13C is an image of cut-plane view of electron density for the PSOMCs-W, according to certain embodiments.
Figure 13D:
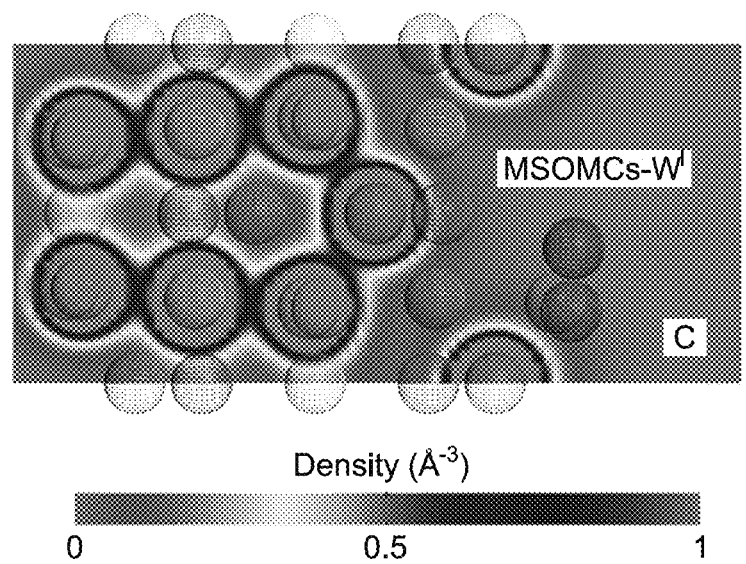
FIG. 13D is an image of cut-plane view of electron density for the MSOMCs-W$^I$, according to certain embodiments.

The impact of Mo dopants on the spin-resolved electronic structure characteristics of PSOMCs-H, MSOMCs-H$^I$, and MSOMCs-H$^{II}$ are revealed by the spin-dependent density of states $DOS_{\uparrow\downarrow}$ (FIG. 13A) and partial density of states ($PDOS_{\uparrow\downarrow}$) projected onto the Mo atoms. (FIG. 13B) The $DOS_{\uparrow\downarrow}$ spectra around the Fermi energy ($E_F$, which is set to zero) where spin-up (↑) states represent positive variations and spin-down (↓) states represent negative variations. A spin asymmetric behavior observed in the spectra implies magnetism arising from transition metals' spin-split d-band electrons. The Mo dopants tune the spin-resolved electronic structure characteristics of PSOMCs-H. An energy gap starting at around 2.5 eV vanishes when the Mo atoms are doped, as shown in FIG. 13A. The $PDOS_{\uparrow\downarrow}$ in FIG. 13B, projected onto the Mo dopants shows the contribution of Mo atoms in each slab to the electronic states. Further FIG. 13B demonstrates the spin asymmetric spectra due to Mo dopants. It reflects that magnetism and accompanying charge transfer may be adjusted by Mo dopants at particular sites. The charge transfer may be presented with Mulliken analysis. The corresponding electron density may be visualized by the mesh cut-off and exposing the density grid sampling. FIGS. 13C-13D shows how adding Mo dopant leads to the adjustment of electron distribution for the representative PSOMCs-W and MSOMCs-W$^I$ structures.

$ZnCo_{2-x}Mo_xO_4$ (x≤0.10) was prepared by hydrothermal route combined with a post-annealing process and evaluated as HER electrocatalysts. The structural analysis and TEM analysis confirmed the presence of cubic $ZnCo_2O_4$ spinel oxide. The nano-microsphere morphology of $ZnCo_{2-x}Mo_xO_4$ (x≤0.10) was shown by FE-SEM results. The successful incorporation of Mo into the $ZnCo_2O_4$ was confirmed by XPS analysis. When the Mo content was increased, the $ZnCo_{2-x}Mo_xO_4$ exhibited an inverted volcano-like trend in HER overpotentials and Tafel slopes. Systematic comparison of the catalytic activity of $ZnCo_{2-x}Mo_xO_4$ reveals that 6% Mo doped $ZnCo_2O_4$ electrocatalyst is highly efficient for HER and exhibits the best HER performance, such as small overpotential (195 mV at 10 mA cm$^{-2}$) and Tafel slope (81.4 mV dec$^{-1}$). Further, the 6% Mo-doped $ZnCo_2O_4$ exhibited higher double-layer capacitance and abundant surface-active sites, thereby reducing the overpotential and improving the HER process. The EIS further confirmed the higher charge transfer kinetics by $ZnCo_{2-x}Mo_xO_4$ (x=0.06) electrocatalysts. the durability and stability of $ZnCo_{2-x}Mo_xO_4$ (x=0.06) electrocatalysts were confirmed by 1000 cycles of LSV followed by 40 hours of long-run stability test. Furthermore, the composition of bimetallic cobalt-based spinel oxide electrocatalysts may be tuned for HER application. The density of state spectra showed that Mo atoms may adjust the electronic structure characteristics of Mo-doped $ZnCo_2O_4$ nanoparticles. DFT calculations showed that, the most negative water adsorption energy is exhibited by the MSOMCs-Wu, showing the highest stability, reactivity, and catalytic activity due to water adsorption. The slab structure MSOMCs-W$^{II}$ adsorbed by hydrogen may be the most efficient catalyst due to HER activity. The catalytic and HER activity may be improved by Mo concentration. Due to the reactivity and adsorption energy of Mo-doped $ZnCo_2O_4$ nanostructures, Mo-doped $ZnCo_2O_4$ may be incorporated in many catalytic applications.

Numerous modifications and variations of the present disclosure are possible in light of the above teachings. It is therefore to be understood that within the scope of the appended claims, the invention may be practiced otherwise than as specifically described herein.

The invention claimed is:

1. An electrode, comprising:
   an electrically conductive substrate; and
   a layer of a molybdenum-doped zinc/cobalt oxide ($ZnCo_{2-x}Mo_xO_4$) at least partially covering a surface of the electrically conductive substrate;
   wherein x is a positive number equal to or less than about 0.1; and
   wherein the layer of the $ZnCo_{2-x}Mo_xO_4$ comprises spherical shaped particles.

2. The electrode of claim 1, wherein the electrically conductive substrate comprises an indium tin oxide (ITO) glass, a fluorine dope tin oxide (FTO) glass, a silicone substrate, a graphite substrate, and a glassy carbon (GC) substrate.

3. The electrode of claim 1, wherein the electrically conductive substrate is a glassy carbon substrate.

4. The electrode of claim 1, wherein the spherical shaped particles of the $ZnCo_{2-x}Mo_xO_4$ have an average particle size of 2 micrometers (µm) to 10 µm.

5. The electrode of claim 1, wherein the spherical shaped particles of the $ZnCo_{2-x}Mo_xO_4$ comprise a porous matrix of interconnected nanoneedles, and wherein the interconnected nanoneedles have an average width of from 0.1 nanometers (nm) to 3 nm.

6. The electrode of claim 1, wherein the spherical shaped particles of the $ZnCo_{2-x}Mo_xO_4$ are aggregated.

7. The electrode of claim 1, wherein x is 0.06, and wherein the electrode has an overpotential of about 195 millivolts (mV) relative to the reversible hydrogen electrode (mV$_{RHE}$) at a current density of about 10 milliamperes per square centimeter (mA/cm$^2$).

8. The electrode of claim 1, wherein x is 0.06, and wherein the electrode has an overpotential of about 280 mV$_{RHE}$ at a current density of about 50 mA/cm$^2$.

9. The electrode of claim 1, having a Tafel slope of from 75 millivolts per second (mV/s) to 115 mV/s.

10. The electrode of claim 1, wherein x is 0.06, and wherein the electrode has a Tafel slope of about 81.4 mV/s.

11. The electrode of claim 1, having a potential of from 0.27 to 0.30 volts relative to the reversible hydrogen electrode (V$_{RHE}$) at a current density of about 50 mA/cm$^2$ for a duration of at least 40 hours.

12. A method of making the electrode of claim 1, comprising preparing the $ZnCo_{2-x}Mo_xO_4$ by:
   mixing and dissolving a Zn salt, a Co salt, a Mo salt, and urea in a solvent to form a mixture;
   heating the mixture at a temperature of about 120 degrees Celsius (° C.) to form a precursor compound in the form of a precipitate; and
   separating the precursor compound from the mixture and calcining at a temperature of from 250 to 450° C.

13. The method of claim 12, wherein the Zn salt comprises zinc acetylacetonate, zinc sulfate, zinc acetate, zinc citrate, zinc iodide, zinc chloride, zinc perchlorate, zinc nitrate, zinc phosphate, zinc triflate, zinc bis(trifluoromethanesulfonyl)imide, zinc tetrafluoroborate, zinc bromide, and/or its hydrate.

14. The method of claim 12, wherein the Co salt comprises cobalt acetylacetonate, cobalt sulfate, cobalt acetate, cobalt citrate, cobalt iodide, cobalt chloride, cobalt perchlorate, cobalt nitrate, cobalt phosphate, cobalt triflate, cobalt bis(trifluoromethanesulfonyl)imide, cobalt tetrafluoroborate, cobalt bromide, and/or its hydrate.

15. The method of claim 12, wherein the Mo salt is ammonium molybdate.

16. The method of claim 12, wherein the calcining the precursor compound is performed at a temperature of about 350° C. for 1 to 6 hours.

17. The method of claim 12, further comprising:
   mixing the $ZnCo_{2-x}Mo_xO_4$, one or more solvents, and a sulfonated polymer to form a slurry; and
   drop-casting the slurry onto a surface of the GC substrate to form a sample; and
   drying the sample.

18. The method of claim 17, wherein the $ZnCo_{2-x}Mo_xO_4$ is present on the surface of the GC substrate in an amount of from 0.25 milligrams per square centimeter (mg/cm$^2$) to 0.32 mg/cm$^2$ of a surface area of the GC substrate in contact with the slurry.

19. A method for electrochemical water splitting, comprising:

applying a potential between a counter and a working electrode in an electrochemical cell containing an electrolyte to form hydrogen and oxygen; and separately collecting $H_2$-enriched gas and $O_2$-enriched gas;

wherein the working electrode comprises the electrode of claim 1; and wherein the electrolyte comprising an aqueous solution of a base at a concentration of 0.05 molar (M) to 5 M.

20. The method of claim 19, wherein the base is at least one selected from the group consisting of sodium hydroxide (NaOH), potassium hydroxide (KOH), lithium hydroxide (LiOH), barium hydroxide ($Ba(OH)_2$), and calcium hydroxide ($Ca(OH)_2$).

\* \* \* \* \*